US006236996B1

(12) United States Patent
Bapat et al.

(10) Patent No.: US 6,236,996 B1
(45) Date of Patent: May 22, 2001

(54) SYSTEM AND METHOD FOR RESTRICTING DATABASE ACCESS TO MANAGED OBJECT INFORMATION USING A PERMISSIONS TABLE THAT SPECIFIES ACCESS RIGHTS TO THE MANAGED OBJECTS

(75) Inventors: Subodh Bapat, Palo Alto; Bart Lee Fisher, Sunnyvale, both of CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 09/465,672

(22) Filed: Dec. 16, 1999

Related U.S. Application Data

(63) Continuation of application No. 09/047,907, filed on Mar. 25, 1998, now Pat. No. 6,038,563, which is a continuation-in-part of application No. 08/962,092, filed on Oct. 31, 1997.

(51) Int. Cl.[7] .................................................... G06F 17/00

(52) U.S. Cl. ...................... 707/9; 707/2; 707/6; 707/101

(58) Field of Search ........................... 707/3–6, 100–104, 707/201–204, 2, 9; 709/223; 450/428; 370/217, 254; 379/243

(56) References Cited

U.S. PATENT DOCUMENTS

| | | | | |
|---|---|---|---|---|
| 5,317,742 | * | 5/1994 | Bapat | 707/3 |
| 5,533,116 | * | 7/1996 | Vesterinen | 379/243 |
| 5,726,979 | * | 3/1998 | Henderson et al. | 370/254 |

(List continued on next page.)

OTHER PUBLICATIONS

International Telecommunications Union (CCITT) "Data Networks and Open System Communications, OSI Management, Information Technology–Open Systems Interconnection—Systems Management: Objects and Attributes for Access Control, ITU–T X.741," (1995).

International Telecommunications Union (CCITT), "Data Communication Networks, Information Technology—Open Systems Interconnection—Systems Management: Security Audit Trail Function, X.740," (1992).

International Telecommunications Union (CCITT), "Data Networks and Open System Communications Security, Information Technology—Open Systems Interconnection—Security Frameworks for Open Systems: Access Control Framework, X.812," (1995).

*Primary Examiner*—Thomas Black
*Assistant Examiner*—David Jung
(74) *Attorney, Agent, or Firm*—Pennie & Edmonds LLP

(57) ABSTRACT

An access control database has access control objects that collectively store information that specifies access rights by users to specified sets of the managed objects. The specified access rights include access rights to obtain management information from the network. An access control server provides users access to the managed objects in accordance with the access rights specified by the access control database. An information transfer mechanism sends management information from the network to a database management system (DBMS) for storage in a set of database tables. Each database table stores management information for a corresponding class of managed objects. An access control procedure limits access to the management information stored in the database tables using at least one permissions table. A permissions table defines a subset of rows in the database tables that are accessible to at least one of the users. The set of database table rows that are accessible corresponds to the managed object access rights specified by the access control database. A user access request to access management information in the database is intercepted, and the access control procedure is invoked when the user access request is a select statement. The database access engine accesses information in the set of database tables using the permissions tables such that each user is allowed access only to management information in the set of database tables that the user would be allowed by the access control database to access.

38 Claims, 17 Drawing Sheets

U.S. PATENT DOCUMENTS

| | | | | |
|---|---|---|---|---|
| 5,892,900 | | 4/1999 | Ginter et al. | 395/186 |
| 5,910,987 | | 6/1999 | Ginter et al. | 395/186 |
| 5,915,019 | | 6/1999 | Ginter et al. | 395/186 |
| 5,917,912 | | 6/1999 | Ginter et al. | 395/186 |
| 5,920,542 | * | 7/1999 | Henderson | 370/217 |
| 5,949,876 | | 9/1999 | Ginter et al. | 395/186 |
| 6,058,103 | * | 5/2000 | Henderson et al. | 709/223 |
| 6,112,085 | * | 8/2000 | Garner et al. | 455/428 |

* cited by examiner

| | | Confirmed Request | | Unconfirmed Request |
|---|---|---|---|---|
| | | Rule Type= Deny with response | Rule Type= Deny without response | |
| Scoped Operation | Atomic | Entire operation fails. A single Access_Denied response is sent back (confirmed requests always receive a response, even if denied without response). | | Entire operation fails. No response is sent back. |
| | Best Effort | Partial operation fails. Access_Denied response is sent back for objects which denied access. Responses sent back for objects which granted access. | Partial operation fails. No Access_Denied response is sent back for objects which denied access. Responses sent back for objects which granted access. | Partial operation fails. No response is sent back (because it is an unconfirmed request). |
| Non-Scoped Operation | | Operation fails. Access_Denied response is sent back to initiator. | Operation fails. No response is sent back to initiator. | Operation fails. No response is sent back |

FIG. 7

| Row | | |
|---|---|---|
| FDN | Data 1 | ... | Data N |

| User Request |
|---|
| SELECT ... FROM View_name |

1102

View_tablename_username — 1110
Username — 1111
Tablename — 1112
Permissions List — 1113
where FDN= — 1114
FDN1(key to object) — 1115
FDN2 — 1116
...
FDNz — 1117

View_tablename_username — 1120
Username — 1122
Tablename — 1124
Permissions Rule — 1126
WHERE FDN=/systemid="A" /Param1="B"/Param2=% — 1128

Granted Permissions Table for Table 1

1502

| User Name | Object Name | Operation Type |
|---|---|---|
| user_x | object_xyz | SELECT |
| user_x | object_qrs | UPDATE |
| user_y | object_xyz | SELECT |
| user_y | object_abc | DELETE |
| user_z | object_def | SELECT |
| group_a | object_hij | SELECT |
| group_z | object_jkl | SELECT |

Denied Permissions Table for Table 1

1504

| User Name | Object Name | Operation Type |
|---|---|---|
| user_x | object_xyz | NULL |
| user_y | NULL | NULL |
| user_z | object_xyz | SELECT |
| user_z | object_abc | DELETE |
| user_z | object_def | INSERT |
| group_z | object_hij | SELECT |
| group_a | object_jkl | SELECT |

FIG. 15B

SYSTEM AND METHOD FOR RESTRICTING DATABASE ACCESS TO MANAGED OBJECT INFORMATION USING A PERMISSIONS TABLE THAT SPECIFIES ACCESS RIGHTS TO THE MANAGED OBJECTS

This is continuation of application Ser. No. 09/047,907, filed Mar. 25, 1998 and now U.S. Pat. No. 6,038,563, which is a continuation-in-part of application Ser. No. 08/962,092, filed on Oct. 31, 1997.

The present invention relates primarily to the management of computer networks, and more particularly to a system and method for limiting access to managed objects and event notifications to authorized users of the managed objects while also providing SQL access to at least a portion of the management information in the network with matching access restrictions.

BACKGROUND OF THE INVENTION

SNMP (Simple Network Management Protocol) was developed to provide a tool for multivendor, interoperable network management. SNMP provides a set of standards for network management, including a protocol, a database structure specification, and a set of data objects. SNMP was adopted as the standard for TCP/IP-based internets in 1989.

An explanation of SNMP technology is beyond the scope of this document and the reader is assumed to be either conversant with SNMP or to have access to conventional textbooks on the subject, such as William Stallings, "SNMP, SNMPv2 and RMON," Addison Wesley (1996), which is hereby incorporated by reference in its entirety as background information. CMIP is a network management protocol like SNMP, except that it is based on OSI standards. The book: "SNMP, SNMPv2 and CMIP: The Practical Guide to Network Management Standards" by William Stallings, which is an excellent source of basic information on CMIP, and on CMIP related standards, is hereby incorporated by reference in its entirety as background information.

Many networks use a network manager and some form of Simple Network Management Protocol (SNMP) or CMIP for managing the network. Among its management tasks, the network manager automatically monitors the status of the devices on the network. The network manager sends event requests to the devices, which are requested to return responses when certain events occur. For example, a disk agent might be requested to send a response if available disk space falls below 50%.

An SNMP-manageable (or CMIP-manageable) device stores in its memory a Management Information Base (MIB), a collection of objects or variables representing different aspects of the device (e.g., configuration, statistics, status, control). For each class of device, the MIB has a core of standard variables. Each vendor of a device will add to the core, variables that it feels are important to the management of its device.

The MIBs for the manageable devices in a network not only store management information that can be retrieved, but also contain variables whose values, when modified by a network manager, modify the operation of the device. Simple examples are disabling a device's operation, changing the priorities assigned to different tasks performed by a device, and changing the set of messages generated by the device and the set of destinations to which those messages are sent.

Clearly, it is important to prevent unauthorized persons from accessing the management information objects in a network. Otherwise, not only will confidential information be obtained by unauthorized persons, but also the network would be open to acts of sabotage. The present invention addresses the subject of access control for network management information objects.

ITU-T X.741 (1995) is an industry standard, published by the Telecommunication standardization sector of the International Telecommunication Union, previously known as the CCITT, entitled Data Networks and Open System Communications, OSI Management. The X.741 standard specifies an access control security model and the management information necessary for creating and administering access control associated with OSI (open systems interconnection) system management.

There are a number of related ITU-T standards that relate to OSI systems management that are relevant to the present invention, particularly X.740 (1992) (security audit trail function) and X.812 (1995) (data networks and open systems communications security). All three of these ITU-T standards, X.741(1995), X.740(1992) and X.812(1995) are hereby incorporated by reference as background information.

While the X.741, X.740 and X.812 standard define a fairly comprehensive access control framework for controlling access to managed objects (also sometimes called network management objects), there remain numerous access control and management issues that are not addressed or resolved by these standards.

In particular, while X.741 and the related standards define access control for limiting access to managed objects, these standards do not address or specify any mechanism for limiting access to event reports. Event reports (usually called event notifications), such as the reports generated when an object is created, deleted, or a management parameter passes a specified threshold, in many systems are broadcast to all listeners. This is clearly unacceptable if the network is, for instance, the telephone switching network owned by a large telecommunications company, and the event reports concern resources being installed or utilized for a particular customer. That is, customer A should not be allowed to receive event reports about network resources being used on behalf of customer B.

In fact, the presumption in X.741 and the related standards is that event report security should be implemented using a mechanism that is separate from the access control mechanism used for restricting access to managed objects. After all, access control to managed objects filters inbound messages requesting access to objects, while event reports are outbound messages.

However, it has been observed by the inventors of the present invention that in many cases, the objects that a person is to be prohibited from accessing are also the objects from which that person should not be receiving event reports. For instance, using the above example, employees of customer A should neither access nor receive event reports for any of the objects that have been allocated to customer B.

Another issue not addressed by X.741 is that customers of large networks often insist upon the ability to generate network management reports using "SQL" type report generators. That is, users of such networks want or require the ability to generate reports on the status of their network resources, while avoiding the complexities of network management information retrieval using SNMP (or any other network management protocol). X.741 and the related standards do not call for, or even suggest, any type of direct SQL-type access to the managed object database for the purpose of generating management reports. In fact, direct SQL-type access might be seen as contrary to the goals of X.741 since it is a potential source of security leaks.

It is therefore a goal of the present invention to provide direct SQL-type access to the managed object database for purposes of report generation, as opposed to other types of object access. The purpose of the direct access mechanism is to allow users to use standard DBMS report generators to define and generate reports about the status or past performance of network objects, while still providing the same access restrictions as those that apply to normal management information access requests.

SUMMARY OF THE INVENTION

In summary, the present invention is a system and method for controlling access to managed objects in a computer network. An access control database has access control objects that collectively store information that specifies access rights by users to specified sets of the managed objects. The specified access rights include access rights to obtain management information from the network. An access control server provides users access to the managed objects in accordance with the access rights specified by the access control database. An information transfer mechanism sends management information from the network to a database management system.

The database management system stores the management information sent by the information transfer mechanism in a set of database tables. Each database table stores the management information for corresponding managed objects in individual rows.

An access control procedure limits access to the management information stored in the database tables using at least one permissions table. A permissions table defines a subset of rows in the database tables that are accessible to at least one of the users. The set of database table rows that are accessible corresponds to the managed object access rights specified by the access control database. A user access request to access management information in the database is intercepted, and the access control procedure is invoked when the user access request is a select statement.

A database access engine accesses information in the set of database tables using the permissions table such that each user is allowed access only to management information in the set of database tables that the user would be allowed by the access control database to access.

BRIEF DESCRIPTION OF THE DRAWINGS

Additional objects and features of the invention will be more readily apparent from the following detailed description and appended claims when taken in conjunction with the drawings, in which:

FIG. 7 depicts a chart for indicating how access request responses are combined when the target of an access request includes more than one managed object.

FIGS. 15A and 15B depict a permission entry as a combination of the fields represented by a tuple.

DESCRIPTION OF THE PREFERRED EMBODIMENTS

Figure 1:
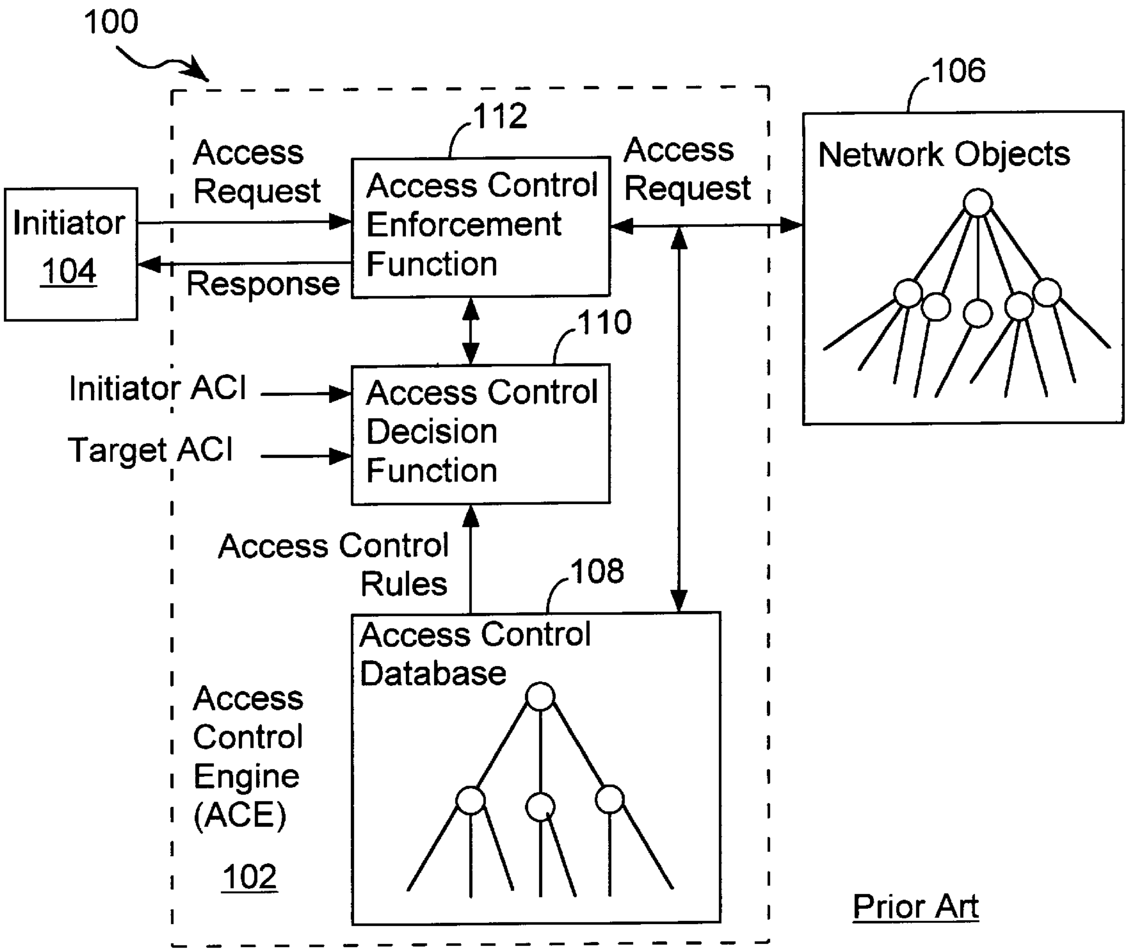
FIG. 1 is a block diagram of an access control engine for restricting access to the managed objects in a network.

Referring to FIG. 1, there is shown a network management system 100 having an access control engine (ACE) 102 that restricts access by initiators 104 (e.g., users, and application programs acting on behalf of users) to the managed objects in a network 106. The network 106 can be virtually any type of computer implemented network that uses a management protocol for performing management functions. For the purposes of this document, we are only concerned with the managed objects in the network, which contain management information and resource control variables. Furthermore, for the purposes of this document, we are primarily concerned with methods of restricting access to managed objects and to event notifications generated by managed objects, and thus we are not particulary concerned with the content and functions of the managed objects.

It should be noted that in many documents, managed objects are called "managed object instances" (MOI's). In such documents, the abbreviations "OI" and "OC" stand for "object instance" and "object class." In the terminology of this document, an object is in fact an object instance, because every object is an instance of a respective object class. For instance, each "router object" in a network is an instance of a respective managed object class. Except when deemed necessary for clarity, the term "object" will be used instead of "object instance" in this document. Also, in the preferred embodiment all the managed objects and access control objects are GDMO compliant.

The access control engine contains an access control database 108. Like the network itself, the access control database 108 consists of a hierarchy of objects. Various aspects of the access control database, as implemented in the present invention, will be described in more detail below. The access control database 108 contains access control rules, which can be applied to access requests in order to determine whether such requests should be denied or granted.

An access control decision function (ACDF) 110 is the procedure (or set of procedures) that applies the access control rules to each access request so as to determine whether the requested access to a managed object should be granted or denied. As will be discussed in more detail below, when an access request has a target of more than one managed object, some portions of an access request may be granted while other portions are denied.

An access control enforcement function (ACEF) 112 is the procedure (or set of procedures) for enforcing the decisions made by the ACDF 110. In particular, the ACEF 112 sends access denial responses when the ACDF 110 returns an access denial, and forwards the access request to the appropriate managed objects when the access is granted.

Figure 2:
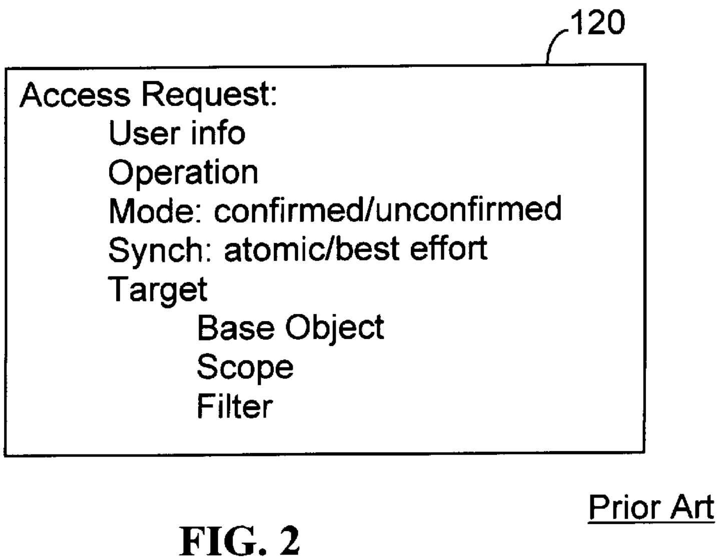
FIG. 2 depicts the data structure of an access request.

Referring to FIG. 2, each access request 120 is a data structure or object containing a set of predefined fields, including:

user information, identifying the request initiator;

operation, which is the type of operation to be performed on the specified target object(s); defined operations include get, set, create, delete, action, filter, multiple object selection, and "receive notifications from"; note that the "receive notifications from" operation (usually called the "event notification" action elsewhere in this document) is not one of the operations defined by X.741, but rather is a new operation added by the inventors for reasons that will be explained below;

mode, equal to confirmed or unconfirmed, which indicates whether or not the management information server should send response messages to the initiator; when the mode is equal to unconfirmed, response messages (e.g., access denial messages) are not sent to the initiator, when the mode is equal to confirmed, response messages are sent to the initiator;

synch, equal to "atomic" or "best effort"; if synch is set to atomic, an access request directed at more than one object is aborted if any portion of the request is denied; if synch is set to best effort, the access request is executed on the objects to which access is granted and the corresponding results are returned to the initiator; and target, which specifies the object or objects the initiator wants to access.

The target in the access request 120 is specified by three fields:

base object, which indicates a particular object in the managed object tree;

scope, which indicates the range of objects above or below the base object in tree to be accessed; in the preferred embodiment base object is always the object in the target set that is closest to the root and the scope indicates a number of object tree levels below (i.e., further from the root) the base object that are to be included as part of the target set; and filter, which sets out a filter condition (e.g., a filter might indicate that only managed objects for routers in Menlo Park, Calif. are to be included in the target set) for restricting the set of objects included in the target set; the filter field is the equivalent of a "where" clause in an database query. A filter can also be used to specify the type of event notifications the user wishes to receive (e.g., SNMP or CMIP event notifications).

A request that has a target set of just one object, because the scope field in the request is unused, is considered to be a "non-scoped" request. A request that has a target set of more than one object, because the scope field in the request indicates more than one object is to be accessed, is considered to be a "scoped" request.

Distribution of Access Control Over Several Servers

Figure 3:
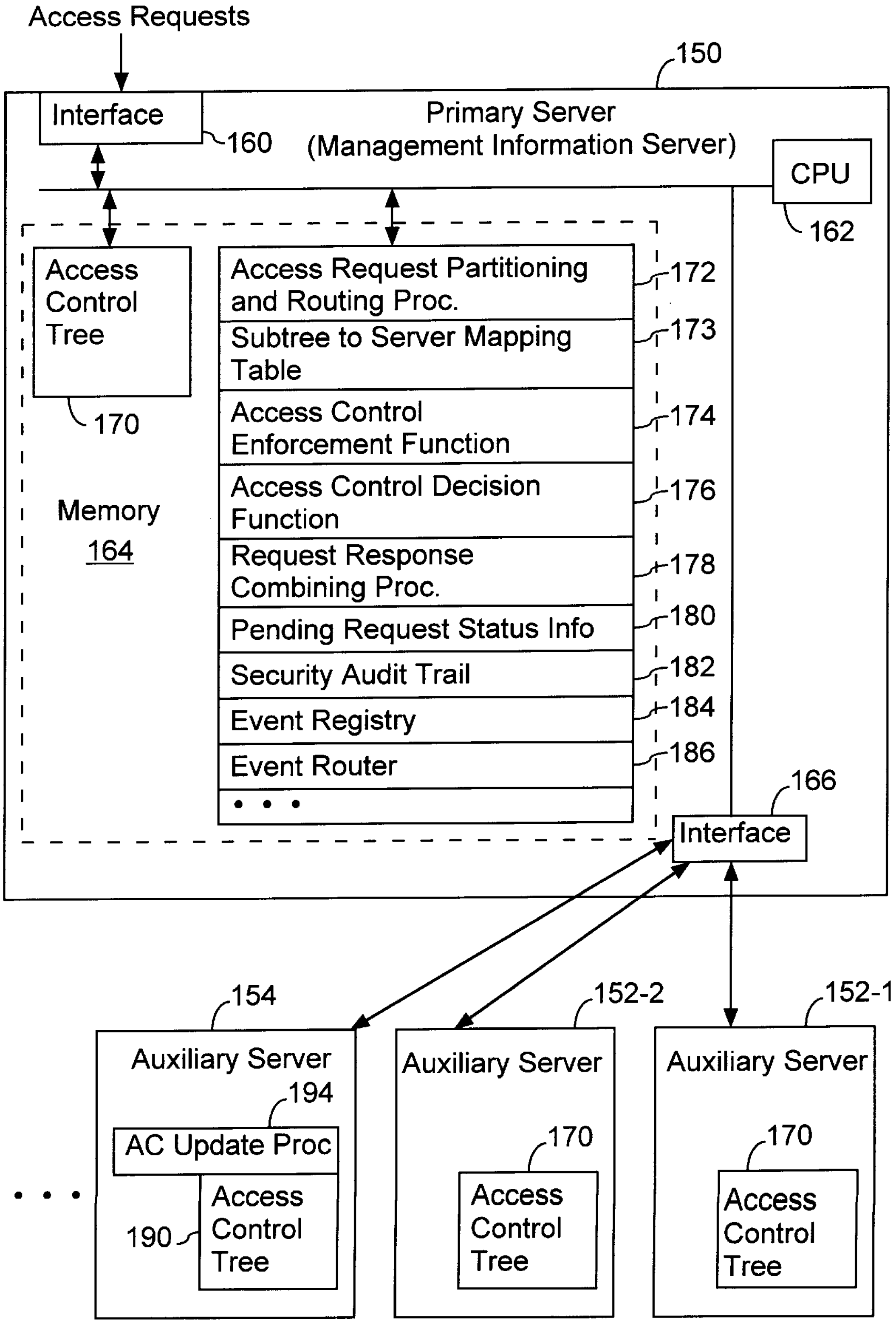
FIG. 3 depicts a distributed access control engine (ACE) in accordance with a preferred embodiment of the present invention.

Referring to FIG. 3, the functions of the access control engine 102 (FIG. 1) are distributed over a plurality of servers so as to increase the speed with which access control is handled. It should be understood that the following explanation of FIG. 3 will contain brief "overview" explanations of the functions performed by some of the system components shown in FIG. 3, and that more detailed explanations of those aspects of the invention not specified in the above referenced standards (e.g., X.741) will be provided in other sections of this document.

In many instances, such as telephone networks, the number of managed objects is extremely large, the number of persons requiring access to the managed objects is correspondingly large, as is the daily volume of access requests. Most access requests are fairly narrowly focused. For instance, a typical access request will request access to the managed objects of a particular type at a particular location. In another example, if a part of the network needs to be shut down for repairs, the target set for the access request will designate the managed objects for the devices to be shut down. Other access requests, especially status information gathering requests, can include very large target sets.

A management information server (MIS) 150 receives all managed object access requests 120, and distributes each request, or portions of the request, to a set of auxiliary servers 152 in accordance with the portion(s) of the managed object tree referenced by the request. Each server 150 and 152 performs both access control functions and the request response gathering functions. Thus, access control processing is divided among the MIS 150 and auxiliary servers 152, enabling faster processing of access requests during periods of heavy request traffic.

In particular, the MIS 150 only performs access control for objects at the top of the managed objects tree, while each of the auxiliary servers performs access control for objects in respective designated subtrees of the managed objects tree. One important exception to the above statement is that all access requests for event notifications (i.e., with an operation of "receive notification from") are delivered to an event registry module in the MIS, regardless of which objects are the targets of the access request. This is discussed in more detail below with respect to event notification access control.

In addition, a special auxiliary server 154 is used to handle all updates to the access control object tree 170 (which is not the same as the prior art access control database 108, for reasons that will be explained below). In some implementations, the special auxiliary server 154 may be merged with the MIS 150 or one of the regular auxiliary servers 152. Alternately, in systems with relatively low access request traffic, the special auxiliary server 154 can be implemented as a separate software entity on the same physical server hardware as one of the other servers.

The MIS 150 and each auxiliary server 152, 154 stores a full copy of the access control object tree 170, but is responsible only for processing requests to access a respective portion of the managed object tree. In an alternate embodiment, each of the MIS and auxiliary servers could store just the portion of the access control object tree 170 needed to perform its assigned access control functions.

If an access request has target objects in the portions of the managed object tree that are serviced by more than one server, the access request is split into access sub-requests by the MIS 150 and sent to the appropriate auxiliary servers 152. The access sub-request responses generated by all the servers are collated by the MIS 150 and returned together to the requesting user or application.

The MIS 150 includes:

- an interface 160 for receiving access requests;
- one or more central processing units (CPU's) 162 for executing access control procedures stored in the MIS's memory 164;
- memory 164, including both volatile high speed RAM and non-volatile storage such as magnetic disk storage;
- an interface 166 for handling secure communications between the MIS 150 and the auxiliary access control servers 152, 154; and
- one or more internal busses 168 for communicating data and programs between the above referenced elements of the MIS 150.

The memory 164 may store:

- a partial or complete copy 170 of an access control tree; it should be noted that the access control tree 170 in the preferred embodiment has different components and organization than those specified in X.741, and therefore the access control tree 108 in FIG. 1 is not the same as the access control tree 170 used in the present invention;
- an access request partitioning and routing procedure 172 for partitioning access requests into access sub-requests and routing the access sub-requests to the appropriate server(s) for access control processing;
- a subtree to server mapping table 173, which stores the information necessary for the MIS 150 to determine the server or servers to which each access request should be sent for access control processing;
- an access control enforcement function 174, whose functionality is the same as that of the ACEF 112 shown in FIG. 1;
- an access control decision function 176, whose functionality is the same as the of the ACDF 110 shown in FIG. 1;
- a request response combining procedure 178 for merging the responses generated by the various servers to each distinct access request and return a single, combined response to the initiator;
- an array 180 of status information about access requests whose processing has not yet been completed;
- a security audit trail 182, for keeping a record of all access requests;
- an event registry 184, which is a mechanism for keeping track of event notifications that particular users have requested; and
- an event router 186, which is a module for sending event notifications to users or applications who have (A) requested those event notifications, and (B) who are authorized to receive them.

Other aspects of the MIS 150 not shown in FIG. 3 will be described below.

The MIS 150 and auxiliary servers 152, 154 all maintain identical copies of a library of access control procedures as well as a copy of the access control object tree 170. Thus, each auxiliary server 152, 154 includes the same hardware and software elements found in the MIS 150, except for (A) the special procedures (172, 178) in the MIS used for handling the receipt and partitioning of access requests, and the combining of responses, and (B) they each have just one interface 160/166 for receiving access requests and returning responses. Each auxiliary server 152 retains either a complete copy 170 of the access control object tree, or the portion of it needed to handle the access requests to be handled by that auxiliary server.

The special auxiliary server 154 maintains a copy 190 of the access control object tree 170 in persistent storage so that the access control objects are available for use by all the access control servers whenever the access control system, or any portions of it, is re-booted or restarted for any reason. The special auxiliary server 154 is also responsible for handling all updates to the access control object tree 170.

In addition to the access control library procedures shared with the other servers, the special auxiliary server 154 has an additional procedure 194 for handling access control to the access control object tree 170/190 and for handling updates of the access control object tree 170/190. The same type of access control that is used to restrict access to managed objects is also used to restrict access to the access control object tree 190/170. In other words, some of the target objects and rule objects in the access control object tree 170 are used to define access rights to the access control objects, and the special auxiliary server 154 restricts access to the access control objects in accordance with the rules defined by those access control objects. In this way only authorized users can access and update the access control object tree 190/170.

The MIS 150 has enough knowledge of the object tree in the network to know which auxiliary servers are needed to service each request. In particular, the MIS 150 has an access request partitioning and routing procedure 172 and a mapping table 173 that stores information identifying a set of "tree division point objects" (also called division point nodes). More specifically, the mapping table 173 contains a sequence of records. Each record identifies a managed object subtree, identified by a topmost object called a tree division point object, and also identifies the server 152 for handling the access requests to objects in that managed object subtree. For each access request, the MIS 150 first applies the "global deny rules," as will be explained in more detail below. If the request is not rejected by a global deny rule, the MIS 150 then traverses the network object tree 170 so as to identify the server or servers required to further process the access request.

More specifically, for each received access request (other than access requests for event notifications) the MIS traverses the network object tree until it reaches any of the division point objects. Since all managed objects below the division point objects are to be processed by a corresponding auxiliary server, the tree traversal stops at those objects. Depending on how the access management duties have been divided among the servers, it is possible that a single access request will have to be partitioned into two or more access sub-requests and sent to two or more of the servers for further processing. When a request is partitioned for processing by more than one server, the base object and scope portions of the each partition of the access request (i.e., each sub-request) are modified so as to only encompass the portion of the managed object tree serviced by the corresponding server.

The MIS 150 also maintains status information 180 on each access request whose processing is not yet completed. The status information 180 identifies all the servers from which partial responses are needed before a complete response can be returned to the initiator.

Depending on the implementation, the MIS 150, in addition to applying the global deny rule to each request, may also be responsible for restricting access to various portions of the managed object tree not allocated to any of the auxiliary servers. For instance, the MIS 150 will typically be responsible for restricting access to the root node of the managed object tree and can also be made responsible for any particular branch of the managed object tree.

In an alternate embodiment, access control responsibilities could be divided among the servers in other ways, for instance on the basis of the type of operation to be performed on the target objects. Thus, one server might be responsible for handling set operations, another create and delete operations, and so on.

The access security rules are stored in persistent storage, with recently used portions also stored in cache memory, at the MIS 150 and each auxiliary server 152. Whenever any access control rule is updated, deleted or added to the system, the rule base in every auxiliary server is updated in synchronized fashion using an event propagation mechanism that is also used for handling other types of event messages. The process for updating the access control tree 170 will be explained in more detail below.

The Access Control Database

While X.741 indicates that object access is to be controlled on a user by user basis, the present invention controls object access on a group by group basis. The user group feature helps to greatly reduce the amount of data required to define each access rule. Each user authorized to access information in the system is assigned to one or more groups. Access rules are defined in terms of access rights of groups. For instance, object parameter reading rights are likely to be assigned using different groups than object parameter setting rights. Also, rules are typically defined hierarchically with respect to these groups, for instance denying access to Customer A's subtree of objects to everyone who is not either a Customer A group member or a system administrator group member, and then further defining rights to objects within Customer A's subtree in accordance with groups of users set up by Customer A.

Figure 4:
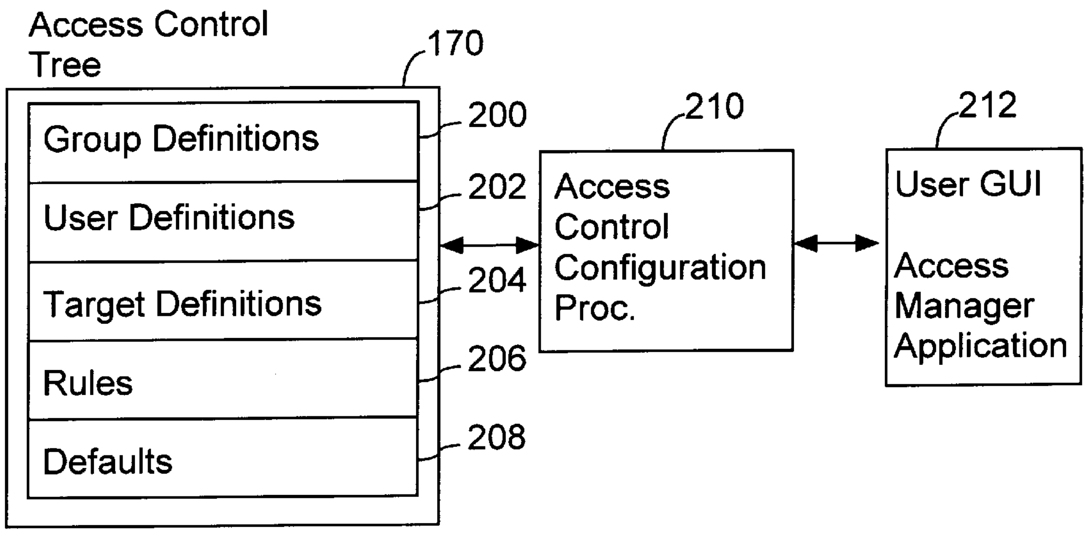
FIG. 4 depicts the access control database and a mechanism for adding objects to the database and for modifying the objects already in the database.

Referring to FIG. 4, the primary components of the access control tree 170 are group definitions 200, user definitions 202, target definitions 204, access rules 206, and default rules 208.

Each group definition 200 is represented by a group object, having the following fields:

group name; and a list of users included in the group.

The group objects are used to map groups to users.

Each user definition 202 is represented by a user object, having the following fields:

user name; and list of groups of which the user is a member.

The user objects are used to identify all the groups to which a particular user belongs.

It should be noted here that the term "users" includes entities other than users that can be granted access rights. For instance, the auxiliary servers, the log server, and even objects in the system can be set up as "users" for the purpose of defining access rights to be accorded to those entities.

Each target definition 204 is represented by a target object, having the following fields:

target name; and a list of base managed objects that are to be included in the target set identified by this target object;

a list of managed object classes; this field is used only when a target set includes all the managed objects of a particular class, subject to the filter condition (see below);

scope, indicating the number of managed object tree levels below the listed base managed objects that are to be included in the target set; and a filter, which is an optional field used to restrict the set of objects included in the target set; the filter field is the equivalent of a "where" clause in an database query; and an operations list, which lists the operations (get, set, etc.) for which the target set is applicable.

Each rule definition 206 is represented by a rule object, having the following fields:

a rule name for identifying the rule;

a group list, that identifies all the user groups to which the rule is applicable;

a targets list, which is a list of the target objects to which the rule is applicable; and an enforcement action, indicating whether the specified groups of users have or do not have access to the specified target set; in a preferred embodiment the enforcement action can be set to Deny with Response, Deny without Response, or Grant.

Default rules 208 are represented by a default rules object, having the following fields:

a list of default enforcement actions for a corresponding predefined list of operations (e.g., get, set, create, delete, etc.); the most typical list of default enforcement actions is to deny access for all operations types, but in some implementations the system administrator might decide to make the default for some operations, such as the get operation, to be "grant";

a default enforcement action for event notifications; and a default denial response (i.e., deny with response or deny without response).

The defaults 208 are default responses that are defined for each operation when no rule has been defined that applies to a particular access request. For instance, the defaults could be set to "Grant" access requests whose operation is "Get", and to "Deny with Response" access requests whose operation is anything other than "Get". However, it is expected that in most implementations all the defaults will be set to either "Deny with Response" or "Deny without Response".

The defaults 208 are preferably defined by a single Default object that contains a grant or deny flag for each of the defined operations.

Each "rule" in the access control tree either grants or denies access by certain groups of users (identified by the group objects referenced in the rule object) to a set of target objects, specified by a target object referenced in the rule object. Unlike X.741, access rules are not defined on a user by user basis, but instead on a group by group basis. As a result, as particular users join and leave the employment of a company using the present invention, only the user and group objects need to be updated, instead of having to update all the rule objects that applied to those users.

In addition to rule objects that specify a set of target managed objects, the system can have one global deny rule object and one global allow rule object. Each of the global rule objects has the same structure as a regular rule object, but has any empty target list field, which indicates the rule is a global rule. The global deny rule, if defined, specifies groups of users that cannot perform any operations on any managed objects. The global grant rule, if defined, specifies groups of "super users" (e.g., system administrators) that are allowed to perform all operations on all managed objects.

Whenever an object in the access control tree 170 is added, deleted or modified, other access control objects may also have to be modified in order to keep the access control tree 170 self-consistent. For instance, if a user object is modified to delete all the groups previously included in the user object's group list and to make the identified user a member of a previously defined "DenyAll" group, all the group objects that used to be listed in the user object will have be updated to delete this user from their user lists, and the DenyAll group object will need to be updated by adding this user to its user list. In another example, if a target object is deleted from the access object tree 170, then all the rule objects that reference the deleted target object will need to be modified so as to remove the deleted target object from their target object lists.

In order to ensure that the access control object tree 170 is maintained in a self-consistent state, all changes to the access control object tree 170 are performed by a procedure called the Access Control Configuration procedure 210. The Access Control Configuration procedure 210 presents a graphical user interface 212 to users authorized to modify the access control tree 170. The Access Control Configuration procedure 210 allows the authorized user to navigate, inspect and modify the access control tree 170. Each time the authorized user specifies a change to be made to the access control tree 170, the Access Control Configuration procedure 210 also makes all the other changes to the access control tree 170 required to keep it self-consistent.

Applying Access Control Rules to Requests

Figure 5:
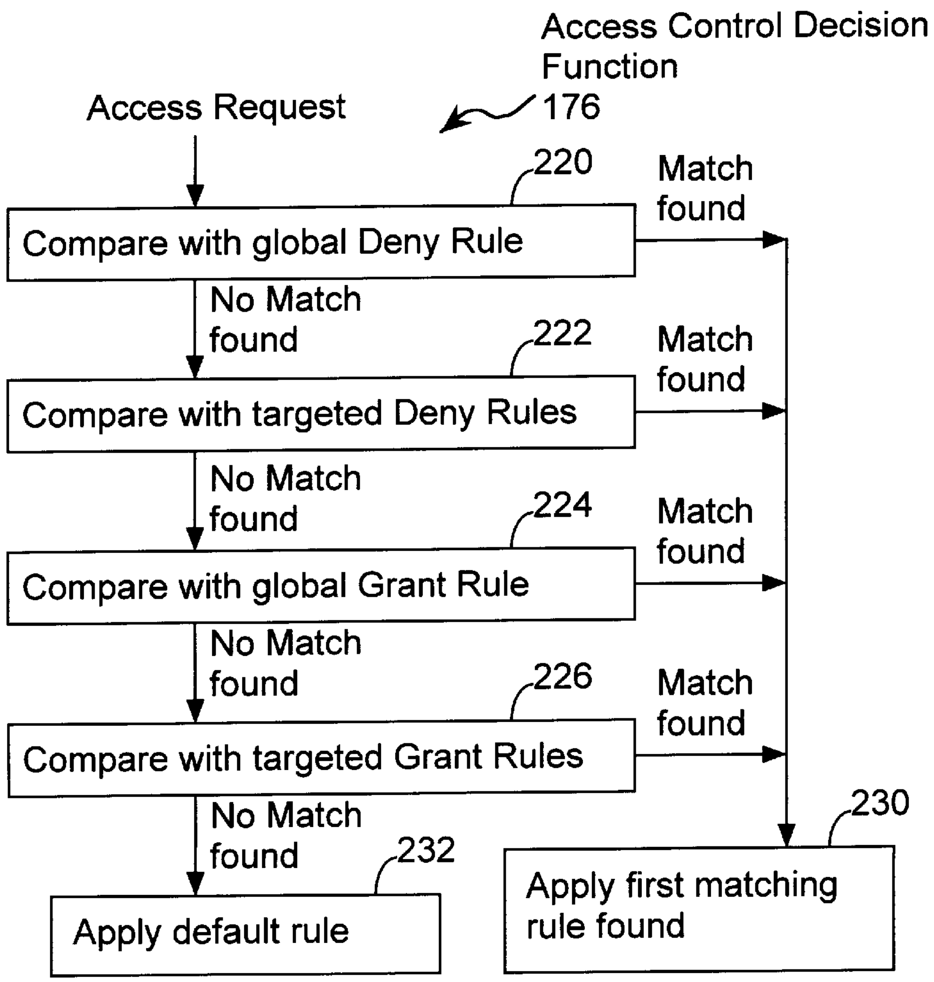
FIG. 5 depicts the order in which access rules are applied for processing each access request.

Referring to FIG. 5, the operation of the access control decision function 176 will first be explained without considering the impact of partitioning requests for processing by one or more servers. Later, request partitioning and the division of duties among the servers will be explained.

When an access request is received, the access request is compared successively with the global deny rule (step 220), the targeted deny rules (step 222), the global grant rule (step 224), and the targeted allow rules (step 226), in that order. The first rule found that matches the access request is applied to it (step 230). If no matching rule is found, then the appropriate default rule is applied (step 232).

By applying the deny rules first, and then the grant rules, access denial rules are given higher priority than access grant rules. Also, this structure makes it relatively easy to define a set of access rules to grant certain access rights to a broad group of users, but then specify subgroups to whom those access rights should be denied.

When an access request has a target set with more than one target object, different rules may apply to different ones of the target objects specified by the request. In that case, the first rule found that is applicable to each particular target object or subgroup of target objects is applied to that target or subgroup of targets. As a result, some portions of an access request may be granted, while others are denied.

Figure 6:
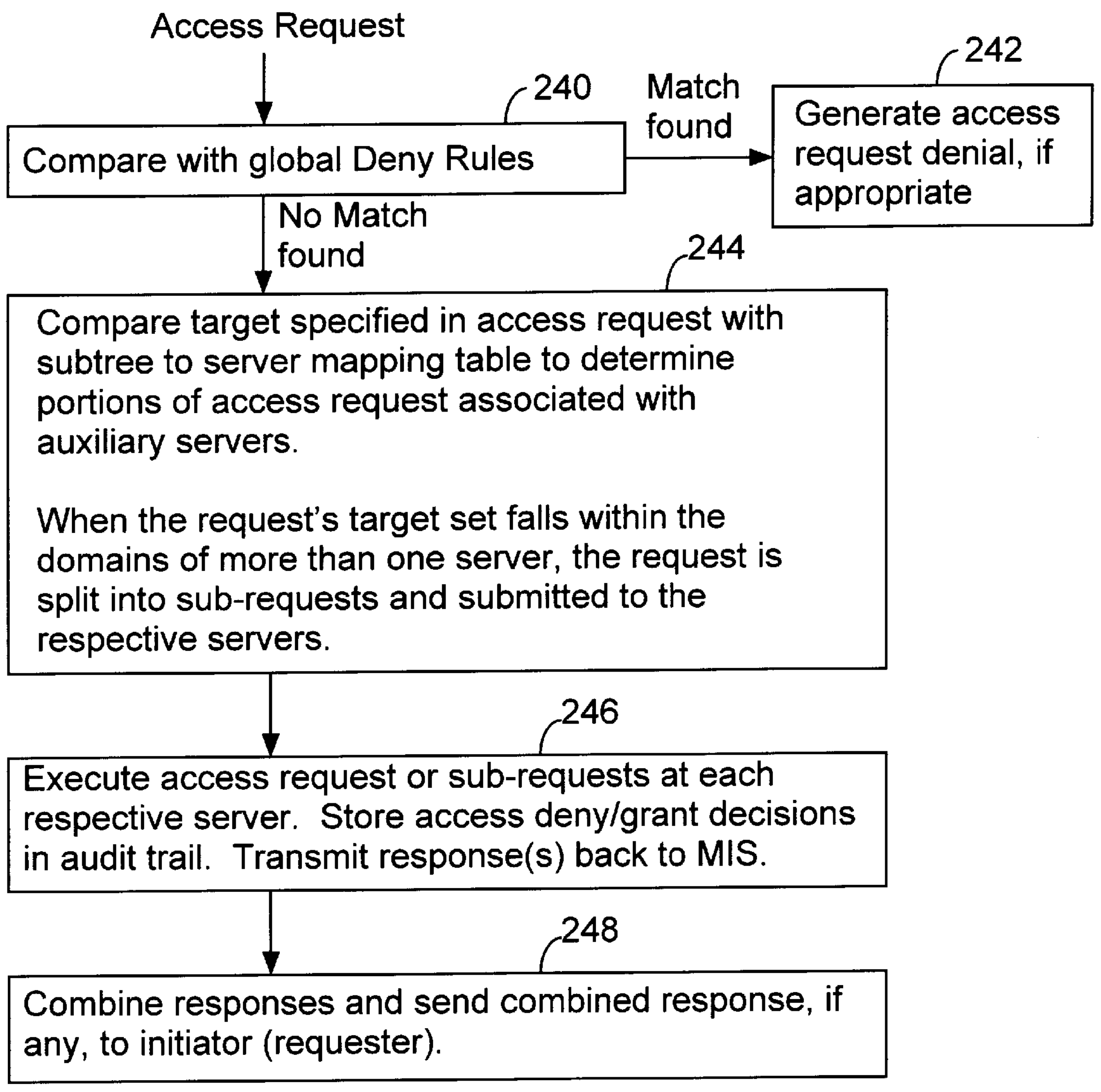
FIG. 6 depicts a procedure for processing an access request, dividing it among the responsible access servers, collating the responses and returning a combined response to the initiator.

Referring to FIG. 6, there is shown the sequence of actions performed by the access request partitioning and routing procedure 172, the access control decision and enforcement functions 176, 174, and the request response combining procedure 178. Note that this discussion does not apply to access requests for event notifications, which are handled separately by the event registry.

Each access request is received by the MIS 150, which then compares the access request with the global deny rule (step 240). If a match is found, the request is denied, and a response is returned to the initiator if appropriate (step 242). No response is returned to the initiator when (A) the applicable global deny rule specifies an enforcement action of "Deny without Response", or (B) the request itself specifies an "unconfirmed" mode.

If no match was found with the global deny rule, the MIS compares the target set specified in the request with the subtree to server mapping table 173 to determine the server or servers to which the request will be sent for processing (step 244). If the request's target set falls within the domain of more than one server, the access request is partitioned into sub-requests, and each sub-request is then sent to its respective server. When a request is partitioned, the target set in the original request is adjusted for each sub-request so as to only specify target objects with the domain of the associated server.

If the request's target set falls within the domain of a single server, the entire request is forwarded to that one server for processing. In some instances, the server for processing the request will be the MIS, in which case the request is added to the end of the MIS's local request queue. Each auxiliary server that receives a request from the MIS puts the received requests on its local request queue for processing. The MIS maintains a status information array 180 (FIG. 3) for all outstanding access requests, with an indication of the server or servers to which they have been sent for processing.

At each server to which an access request is sent for processing, the access request is executed by performing the access control decision function and then the access control enforcement function. More particular, referring back to FIG. 5, steps 222 through 232 of the access control decision function are performed at each server, since step 220 has already been performed by the MIS. The deny/grant decision for each access request may be stored in a security audit trail.

In a preferred embodiment of the present invention, the access control decision function can be configured, through the use of a global configuration parameter, to invoke any one of the following levels of "logging" of access decisions in the security audit trail: (A) off, with no information being logged, (B) storing summary information about access request grants and denials, denoting only the identity of the initiator, the requested operation, and the target object or set of objects to which access was granted or denied, and (C) a full logging level in which, for each access request grant or denial the entire access request is logged as well as full information about the target objects to which access was granted or denied.

At each server, the responses generated by requests and sub-requests are determined and sent back to the MIS (step 246). Finally, at the MIS, if a request was partitioned into two or more sub-requests, the responses are combined and the combined response, if any, is returned to the initiator (step 248). If a request was not partitioned, the response, if any, is forwarded to the initiator. Also, the access request is deleted from the pending request status table 180 (FIG. 3).

Combining Responses When A Request has More than One Target Object

FIG. 7 is a chart indicating how access request responses are combined when the target set of an access request includes more than one managed object. The chart in FIG. 7 is applied only when access to at least one target object specified by a request has been denied. When access to all the target objects is granted, the responses generated by all the target objects are simply combined and returned to the initiator.

When there is only one object in the target set of a request, corresponding to the "non-scoped operation" row of the chart in FIG. 7, there is no need to combine responses. If the request is a confirmed request the access denied response generated by the applicable rule is returned to the initiator. If the response generated by the applicable rule is a "deny without response", then no response is returned. If the request is an unconfirmed request, no response is returned regardless of whether the request is granted or denied.

When a request specifies more than one target object, corresponding to the "scoped operation" portion of the chart in FIG. 7, the type of response returned depends on the request's synch parameter. If the request is an atomic request, when access to any of the target objects is denied the entire operation fails. If the request is a confirmed request, a single "access denied" response is returned to the initiator. Otherwise, if the request is an unconfirmed request, no response is returned to the initiator.

When the request specifies more than one target object ("scoped operation") and specifies a "best effort" synch mode, the responses generated by the objects for which access is granted are returned to the user. For each object to which access is denied, an access denied" response is returned if the request is a confirmed request and the applicable rule has an enforcement action of "deny with response". Otherwise, if the applicable rule has an enforcement action of "deny without response", no response is returned for the object(s) to which access is denied.

Finally, if the request was an unconfirmed request, no response is returned to the initiator regardless of which portions of the request were granted and which were denied. It should be noted that an unconfirmed request cannot have a "get" operation, since by definition the purpose of a "get" response is to retrieve information.

The response combining operation summarized in FIG. 7 is performed first at each server 150, 152 where the request or sub-request is processed, and again at the MIS for those requests that are partitioned into sub-requests. For atomic access requests that are partitioned and processed at more than one server, the access control enforcement function is performed only after the results for the access control decision function have been combined by the MIS. When an access request is processed at just one server (i.e., all its target objects fall within the domain of a single server 150, 152), the response combining operation is performed only by the server processing the request.

Limiting Access to Event Notifications

In the present invention, access to Events (Notifications) is controlled in the same way as access to objects, using rules in the access control rule base. X.741 does not include event notifications as one of the types of operation types to which the access control mechanism of X.741 is applicable. An example of the event notification access control problem is as follows: a telephone network provider does not want customer A to receive notifications about new network resources installed for customer B, but customer A registers itself to receive all event notifications.

The present invention solves the event notification access control problem by (A) adding event notifications to the set of operation types that are governed by rules in the access rules database, and (B) adding a filtering mechanism to the system's event router that filters event notification messages based on the rules in the access rules database.

Thus, when a target object is defined in the access control object tree 170, one of the operations that can be specified in the target object's operations list is "event notifications". In a preferred embodiment, the event notification operation specified in a target object can either specify all event notifications for a set of specified managed objects, or it can specify certain specific types of event notifications by using the filter field of the target object to specify the types of event notifications to be included in the target object. For instance, a target object might apply to SNMP or CMIP generated events, but not to other types of events such as object creation and deletion events.

Further, a particular target object can be used to define access rights to a set of managed objects for several operations including event notifications. For instance, a target object that is to be used with a deny rule for denying access to any and all information regarding a particular set of managed objects will typically include event notifications in its list of operations. Alternately, when appropriate, separate target objects can be used to define event notification access rights.

Figure 8:
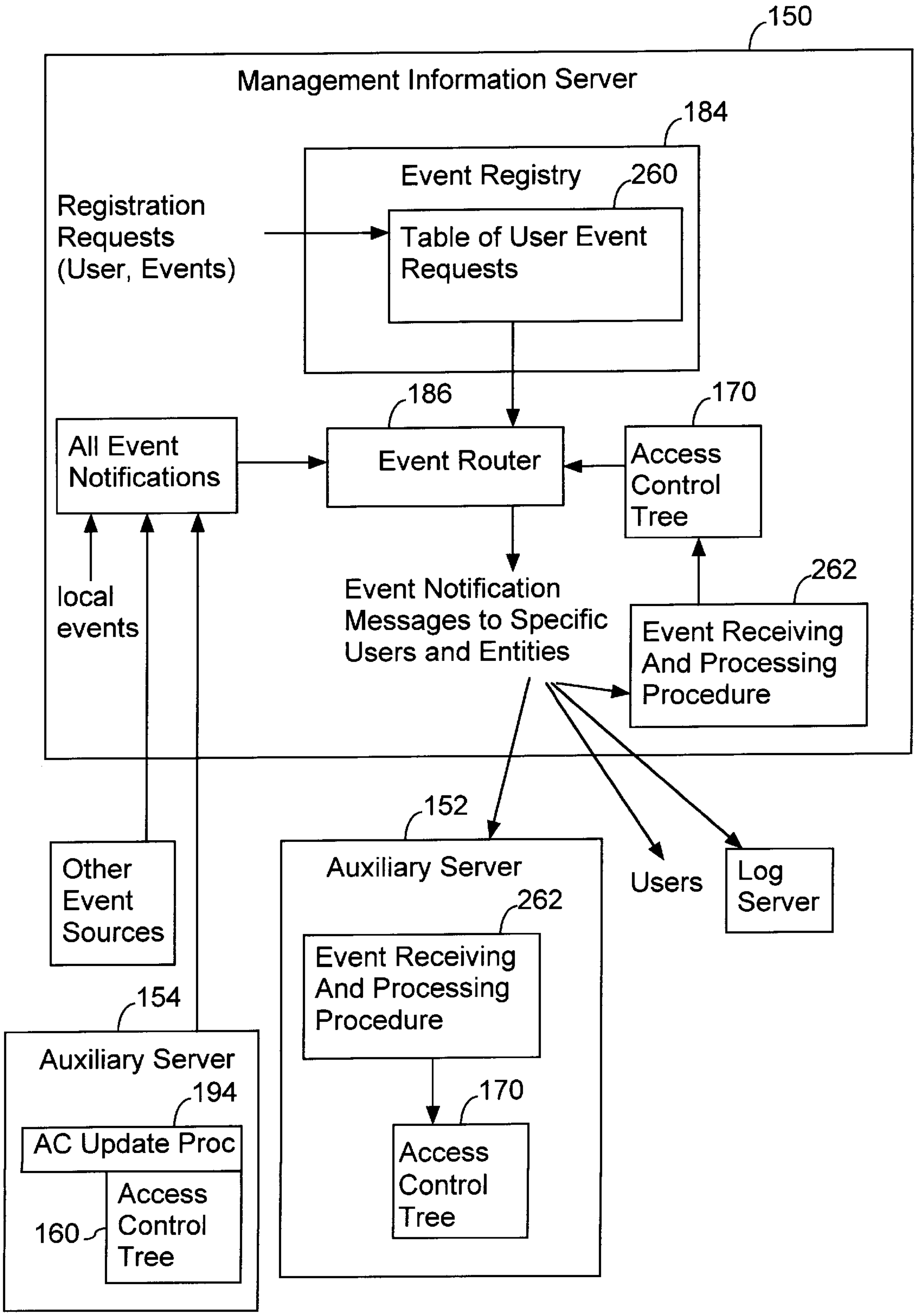
FIG. 8 depicts the event registry and event router portions of a management information server in a preferred embodiment of the present invention.

Referring to FIG. 8, the MIS 150 maintains an event registry 184. More accurately, the event registry 184 is a software module that maintains a table 260 of user event requests. The MIS directs all access requests whose specified operation type is "event notification" to the event registry 184, regardless of which objects are specified by the request. The table 260 stores information denoting, for specified event notifications that can be generated by either the managed objects or the access control objects, which users or other entities have registered a requested to receive copies of those event notifications. The event registry table 260 only stores information about events that users and other entities have requested. The event notification registration requests (which are access requests with an operation type equal to "event notification") can be specified either in terms of specified objects, specified classes of objects, or specified subtrees of objects. Thus, for instance, a user could request receipt of all event notifications for router objects (i.e., which is a class of objects), and could further specify a filter, such as only routers located in the state of California or routers manufactured by a particular company. Users and entities can also revoke prior requests.

In the preferred embodiment, the event registry 184 only checks registration requests to ensure that the requests are semantically correct and that the specified objects for which events are requested actually exist. Thus, in the preferred embodiment the event registry 184 does not check to see if the user or entity making a registration request has the security clearance to actually receive the requested notifications. That job is given to the event router 186, which checks event notification access rights at the time each event notification is being processed. As a result, any changes in a user's access rights to event notifications are taken into account by the event router and do not affect the information stored in the event registry 184.

Entities other than users that can register to receive event notifications include: the MIS 150 and auxiliary servers 152, the log server (which will be discussed below), and even objects (e.g., database objects, which are discussed below) that are part of the access control engine.

All event notifications, including event notifications generated by managed objects (indicated by "other event sources" in FIG. 8) and event notifications generated by access control objects (indicated by the special auxiliary server 154 in FIG. 8), are delivered to the event router 186 in the MIS 150. The event router 186 also has access to the access control tree 170 and the table of user event requests 260 in the event registry 184. For each event notification received by the event router 186, the event router first determines which users and entities have requested a copy of that event notification, and then determines which of those users and entities have the right to receive those event notifications. The determination of access rights to event notifications is performed using the access control decision function, as shown in FIG. 5. Thus, the event router looks, in sequence, at the global deny rule, the targeted deny rules, the global grant rule and the targeted grant rules until a matching rule is identified. A default rule is applied if no matching rule is found. A matching rule must (A) apply to the "event notification" operation, (B) apply to the object that generated the event notification, and (C) apply to a group of which the requester is a member.

For each requester of an event notification that has access rights to that event notification, the event router generates a corresponding event notification message, each of which is addressed to a single authorized user or entity. Thus a single event notification may result in zero event notification messages, or many, depending on the number of requesters with corresponding access rights.

One specific application of the event registry 184 and event router 186 used in the preferred embodiments is as follows. There is a special auxiliary server 154 that handles all access requests to and modifications of the access control tree 170. In other words, access requests (other than event notification access requests) whose target set is located in the access control tree 170 are routed by the MIS 150 to the special auxiliary server 154. Furthermore, all changes to the access control tree 170 result in the generation of event notifications that are sent to the event router 186. In particular, the creation of new access control objects, the deletion of access control objects, and the modification of the attributes of any access control object, all result in the generation of event notifications.

The MIS 150 and auxiliary servers 152 are all automatically registered in the event registry 184 to receive all event notifications related to changes in the access control tree 170. The MIS 150 and auxiliary servers are also included in a set of "super users" with access rights to all event notifications. Furthermore, among the library procedures shared by the MIS 150 and auxiliary servers 152 is an event receiving and processing procedure 262. When the MIS 150 and auxiliary servers 152 receive any event notifications indicating a change in the access control tree 170, the event processing procedure 262, which is invoked by each server, makes the same change to the server's local copy of the access control tree 170. As a result, the local copies of the access control tree 170 in each of the servers 150, 152 are updated virtually simultaneously.

Direct Database Access to Management Information

X.741 does not call for, or even suggest, SQL access to the managed object database. In fact, direct access via a DBMS mechanism might be seen as contrary to the goals of X.741 since it is a potential source of security leaks. However, corporate customers of large communication networks are demanding direct "read only" access to management information for purposes of report generation.

The direct access mechanism of the present invention provides limited, read only access to management information using standard DBMS report generators to define and generate reports about the status or past performance of network objects. This is convenient for users, and avoids the complexities of network management information retrieval using SNMP (or any other network management protocol) when the only task to be performed is the generation of status reports and other network system analysis reports.

The direct access mechanism of the present invention only allows users access to information that would be granted if requested via the normal management interface to the network.

Figure 9:
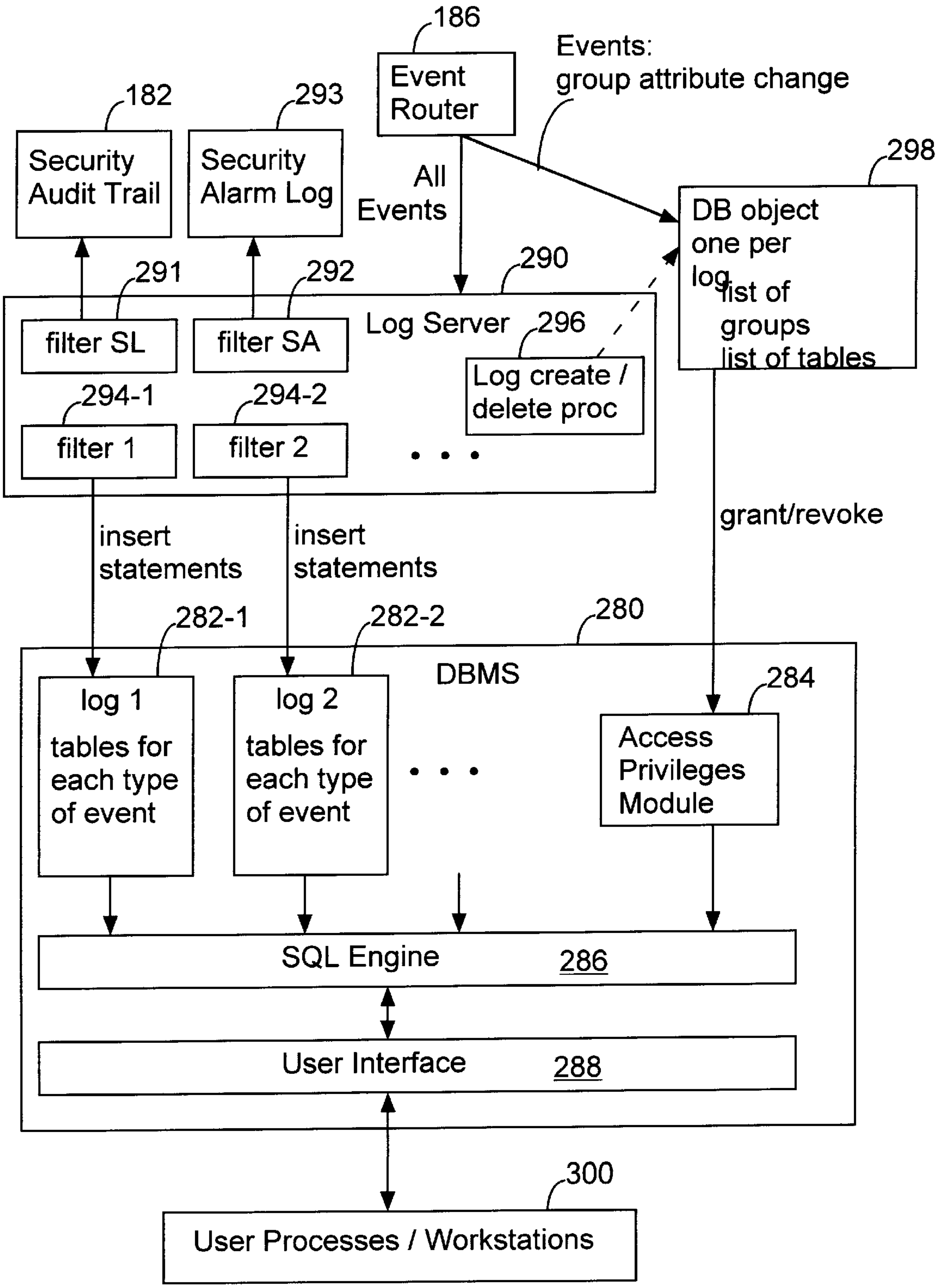
FIG. 9 depicts a supplemental access mechanism for providing SQL type read only access to log records, relating to event notifications generated by managed objects, while maintaining the same security restrictions on access to managed object information as that provided by the management information server for the network.

Referring to FIG. 9, the primary components of the direct information access mechanism are: a conventional database management system (DBMS) 280 for storing event logs 282, each of which stores event notifications to which various users have requested direct SQL type access; and a log server 290 whose primary function is to convert event notifications into SQL insert statements for storing event notifications in the event logs.

The DBMS 280, being conventional, stores tables of information. While FIG. 9 shows event logs 282, each event log is actually one or more database tables, where each database table stores a different type of event notification. The DBMS 280 also has an access privileges module 284, which configures (i.e., establishes) access rights to each of the tables in the DBMS. For instance, the access privileges module 284 may have an access privileges table that stores access rights information indicating which users have access to the tables that make up the event logs 282. However, the access privileges module 284 may be implemented in other ways, such as by storing access privileged information with each database table. The present application does not depend on the particular mechanism used by the access privileges module 284 to establish database table access rights.

In the preferred embodiment, only the log server 290 (besides the system administrator) has write access to the event log tables, while specified users have read access to specific tables. A standard SQL engine 286 processes insert statements from the log server 290 as well as read requests from user processes or workstations 300 that are submitted via a user communications interface 288.

The log server 290 is registered with the event registry to receive all event notifications generated by the system, and has corresponding access rights. The log server 290 is preferably a software entity or process that runs on the same computer or computer node as the MIS 150. A set of filters 291, 294 in the log server 290 determine which event notifications are stored, as well as where. A first filter 291 in the log server is called the security audit trail filter. This filter 291 passes "access grant" and "access denial" event notifications generated by the MIS 150 and auxiliary servers 152 (see FIG. 8). The security audit trail filter 291 can selectively store either the entire event notification, or a specified portion of it, in the security audit trail file 182. More specifically, when the security audit trail is configured to work in a detailed mode, the security audit trail 182 stores every access request and the corresponding outcome in its entirety. When the security audit trail is configured to work in an abbreviated mode, the security audit trail 182 stores a shortened representation of every access request and the corresponding outcome.

Another log server filter 292, called the security alarm filter, is used to generate a Security Alarm log 293 that is separate from the security audit trail 182, where security alarms are generated and stored in the log only when there is a denial of object access. In the preferred embodiment the stored security alarms identifies the user that initiated each denied access request.

The other type of log server filter shown in FIG. 9 are the event log filters 294. Each event log filter is set up to pass only a specified set of event notifications. For instance a particular customer might request that certain groups of its employees have direct access to all SNMP/CMIP event notifications for managed objects assigned to that customer. The log create/delete procedure 296 is used to define a corresponding event log by:

(A) defining and initializing a corresponding set of DBMS tables 282 (i.e., an event log) for storing the requested event notifications (one distinct DBMS table per distinct event notification type);

(B) defining and creating a database object 298, and registering the database object 298 with the event registry to receive event notifications affecting the rights of users to receive those event notifications; the database object 298 includes a first attribute that contains a list of the DBMS tables in which the event log is stored, and a second attribute that contains a list of the groups with access rights to the event notifications;

(C) as group names are first added to the database object 298, the database object 298 sends an initial set of database table access grant commands to the DBMS to define the initial set of users with access rights to the tables making up the event log 282; and (D) defining and creating an event log filter 282 for passing only the requested event notifications and for converting them into SQL insert statements for inserting each passed event notification into a corresponding one of the DBMS tables.

For each event log 282 there are one or more corresponding target objects in the access control object tree 170 that define (1) the target set of managed objects for which event notifications are to be stored in the event log, and (2) the types of event notifications to be included in the event log. For any particular event log, the set of groups of authorized users must be the same for all event notifications in that event log. Any changes in the groups of users to be granted access to the event log are communicated to the corresponding database object 198 by registering the database object with the event registry to receive event notifications about attribute changes to the target object(s) corresponding to the event log. The database object 298 is also registered to receive event notifications of attribute changes to the group objects for the groups that have access rights to the event log.

Whenever the database object 298 for a particular event log 282 is notified of a change (i.e., additions and/or deletions) in the membership of one of the groups with access rights to the event log 291, or a change in the set of groups to be given access to the event notifications in the event log, the database object 298 sends corresponding access grant and access revoke commands to the DBMS 280. The access privileges module 284 then reconfigures the database table access rights accordingly.

As event notifications corresponding to an event log are generated, they are forwarded by the event router 186 to the log server 290. The log server 290 forwards them to the event log's filter 294, where they are converted into SQL insert statements and sent to the DBMS 280 for storage. If some of the same event notifications are included in two (or more) different event logs 282, the same event notification will be stored two (or more) times in different tables of the DBMS.

The SQL engine 286 enforces previously defined access restrictions to the event logs. In particular, every user query for information from the tables in the DBMS is checked by the SQL engine 286 against the access rights established by the access privileges module 284, and only queries in full compliance with those access rights are processed. User queries requesting information from tables to which the user does not have access rights are rejected by the SQL engine 286.

Because user requests for information from the DBMS 280 must be submitted in the form of SQL queries, all the report generator tools available for the DBMS can be applied to creating SQL queries for management information. Thus, the DBMS access mechanism shown in FIG. 9 provides the convenience of using fast and well known DBMS access tools while still providing the same access restrictions as those provided by the management information server. Furthermore, the access restrictions imposed by the DBMS 280 are automatically updated whenever the access rights to the corresponding event notifications are modified in the main access control engine that controls access to information in the managed object tree.

Alternate Embodiments

One embodiment of direct SQL access to management information stored in the managed object database has been described above. Two more embodiments will be described below.

Although access control has been limited to groups of users in the description above, in both the second and third embodiments described below, access control is expanded to include not only groups but also individual users. The direct access mechanism of the present invention allows users access to information that would be granted if requested via the normal management interface to the network.

In the description below, similar reference numerals will be used to refer to similar components, including those components already described.

A Second Embodiment of a Direct Information Access System

Figure 10:
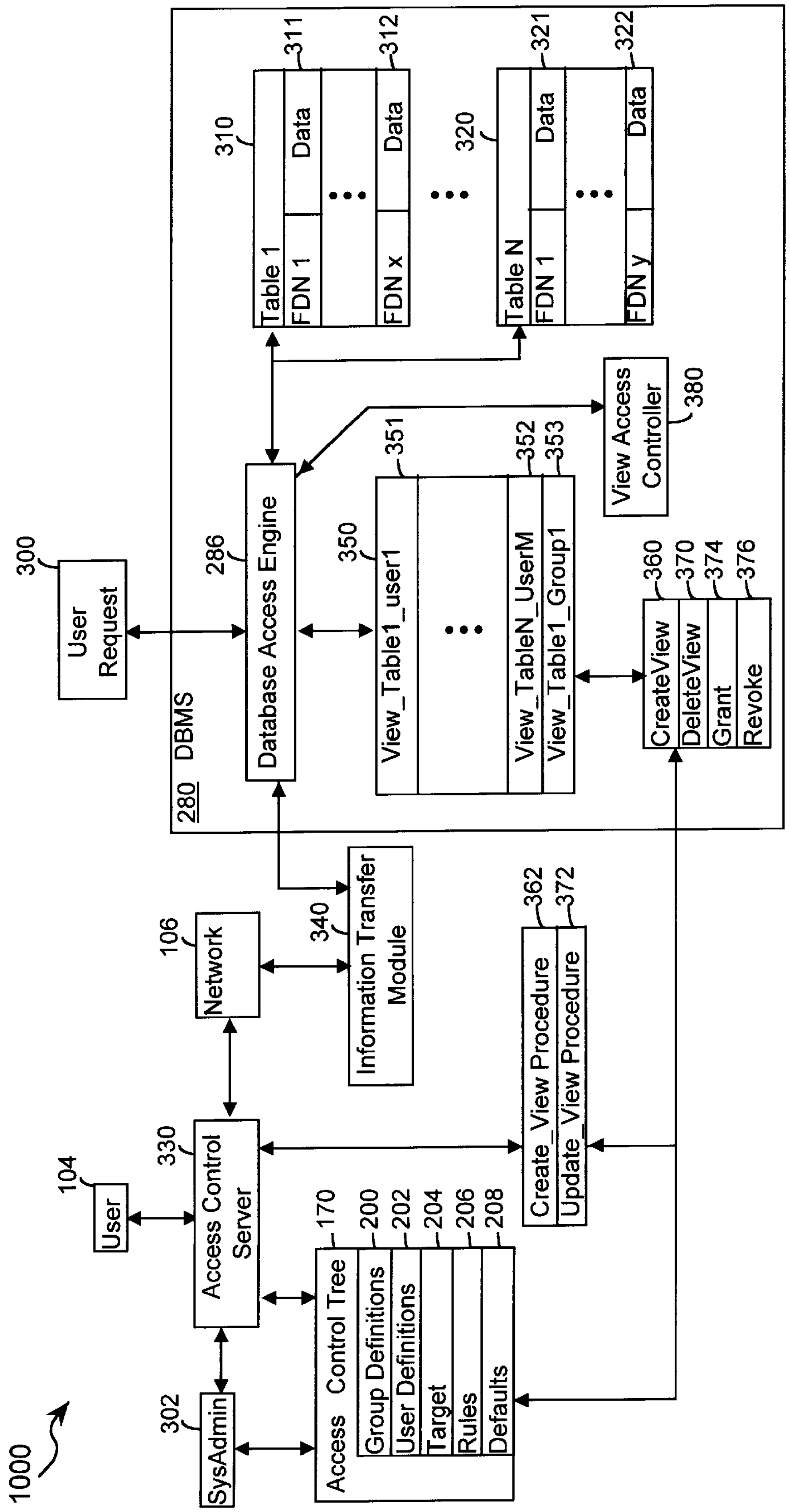
FIG. 10 is a block diagram of a second embodiment of a supplemental access mechanism for providing SQL type read only access to a set of database tables storing information relating to managed objects, while maintaining the same security restrictions on access to the managed object information as that provided by the management information server for the network.

Referring to FIG. 10, a direct information access system 1000 that uses views is shown. The primary components of the direct information access system 1000 are: a conventional DBMS 280 for storing tables 310, 320, an access control server 330, an access control tree 170, an information transfer module 340, and a network 106. The network 106 and access control tree 170 have been described above.

The access control server 330 comprises the access control decision function 110 and the access control enforcement function 112 that were described above.

The information transfer module 340 comprises the event router 186 and the log server 290 that were described above. In addition, the information transfer module 340 can transfer non-event related information, such as managed object status values, from the network 106 to tables 310, 320 in the DBMS 280.

As described above, in the preferred embodiment, only the information transfer module 340 and the system administrator have write access to the tables, while specified users have read access to specific tables. A standard database access engine 286 such as an SQL engine, processes insert statements from the information transfer module 340 as well as read requests from user processes or workstations 300.

The DBMS 280 stores tables of information, Tables 1 through N, 310 and 320 respectively. More specifically, each table 310, 320 stores either entries in an event log or management information for one class of managed objects (e.g., routers). The tables 310, 320 store management information in rows 311, 312, 321, 322.

Figure 11A:
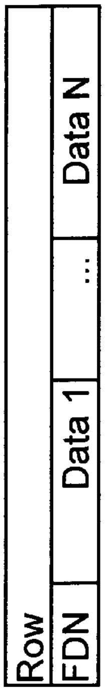
FIG. 11A depicts a preferable row format using the fully distinguished name (FDN) of the managed object.

Referring also to FIG. 11A, the format of each row in the database tables preferably includes a field called the "fully distinguished name" (FDN) of a managed object followed by columns of data: Data 1, . . . , Data N. Preferably, the FDN for each row represents the tree path (through the managed object tree) for the managed object whose information is stored in that row. The tree path for an object may be represented in the form "/a/b/c/ . . . " where a, b, and c indicate nodes along the tree path. For example, an FDN can look like:

/systemid="sys1"/owner="accompany"/devicetype="router"/ . . .

The FDN operates as the primary key to the data stored in the table. Using security mechanisms that will be described below, the FDN is used as the key that determines which managed objects that a particular user is permitted to access or modify.

Referring back to FIG. 10, unlike the embodiment described above, in this embodiment, the rows 311, 312, 321, 322 of the tables 310, 320 contain management information for managed objects associated with the networks of many users. The present invention provides a way to restrict access to the management information in the database tables 310, 320 so that each user is allowed access only to the management information that the user would be allowed to access by the access control server 330. That is, the same management information access rights and restrictions that are represented by the access control tree 170 are also enforced by the DBMS.

Views

To limit user access to the management information stored in the tables, this second embodiment uses a database function called "Views." The database access engine 286 of the DBMS 280 has a module that implements Views. Views are well known tools used by database engines. Views are sometimes used to make it easier for unskilled users to generate queries, for instance by assigning easy to remember aliases to database table columns. It is also well known that Views can also be used to limit the columns and rows of database tables that are accessible to users.

A View can be used to limit access by, in essence, hiding certain columns and rows from the user, or alternately by limiting the user's access to specifically designated columns and rows. Some database engines also provide a security mechanism for limiting use of a particular View to a specified set of users. These functions of Views are well known to those skilled in the art and will not be described in detail, except to the extent that they are utilized by this embodiment of the present invention.

Instead of directly accessing the columns (fields) of a table 310, 320, using the name of the table as a parameter in an SQL command, the user must access the database tables through a View to which the user has been given access rights. The View filters the users data access requests so as to limit the table rows and columns to which the user is given access.

In this embodiment, a separate View is used for each possible pairing of users and database tables and each View is named in a manner that identifies the user-table pair. Preferably the naming convention for Views is "view_tablename_username," where "tablename" represents the name of the table and "username" represents the name of the user. For example, the set of Views 350 includes a view 351 with the name "view_Table1_user1."

Figure 11B:
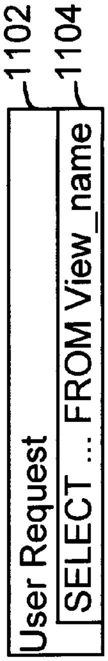
FIG. 11B depicts a user request having a viewname with a format of view_tablename_username.
Figure 11C:
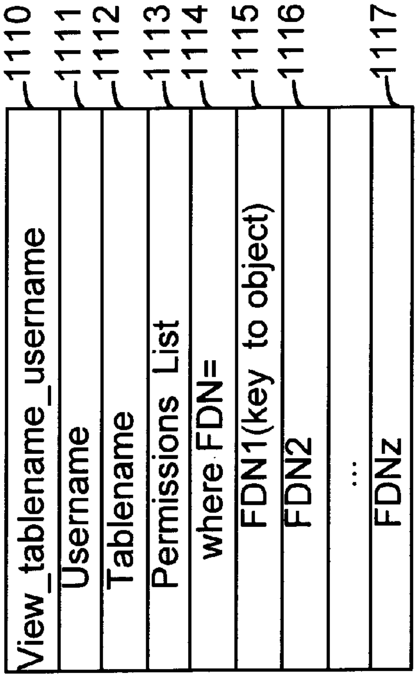
FIG. 11C depicts the parameters used to create an explicit view: the user name, the table name and a permissions list.
Figure 11D:
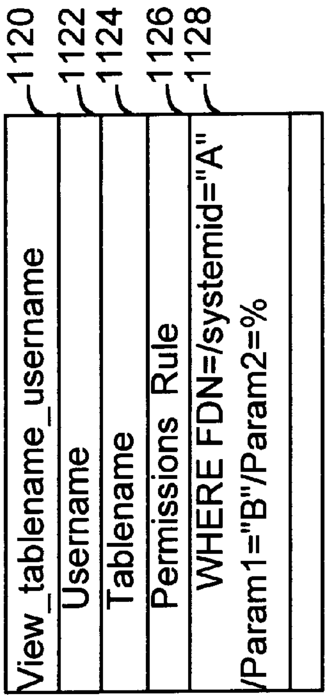
FIG. 11D depicts the parameters used to create an implicit view: the user name, the table name and the SQL permissions rule.

Referring also to FIG. 11B, a user request 1102 for management information includes as part of the request one or more View names, each View name following the "view_tablename_username" naming convention. Each name of a View is used in SQL commands instead of the corresponding table name. For instance, to read the data in a table named "table 1" for a managed object whose FDN is equal to "/a/b/c," an authorized user named "Max" would use the SQL command: SELECT*FROM view_table1_max WHERE FDN="a/b/c".

In the preferred embodiment, Views are generated for each desired user name—table name pairing. Alternately, Views could be generated for each desired group name—table name pairing. In an alternative embodiment, a separate View is defined for each user name, but is used to access multiple tables. Alternatively, each View is defined for a group of users (corresponding to a single group name) and is used to access multiple tables.

Creating a View

Prior to using a View, the View must be created. Preferably, the system administrator 302 creates the Views 350 by invoking a "Create View" procedure 362 stored in the access control server 330. The system administrator 302 invokes a call to the Create_View procedure 362, which in turn causes the DBMS 280 to execute a Create View SQL command 360 to create the desired View. The Create_View procedure 362 maps the user access rights as defined by the access control tree 170 into a SQL command to create the View 351, 352.

In this second embodiment (and in the third embodiment as well), the access control tree 170 includes group objects 200 and user objects 202 that together list all the users who are permitted to access the managed objects.

When calling the Create_View procedure 362, the parameters passed to the procedure include a list of user names and a list of database tables containing managed objects. The Views for every possible pairing of the listed user names and tables are generated based on the current object access rules for the listed tables.

For a given user and database table, the Create_View procedure 362 creates a unique user target map called the userTargetMap. The userTargetMap has a global Deny Flag, a global Grant Flag, an item Deny list and an item Grant list. An item corresponds to a row and the row stores management information associated with one managed object. To construct the userTarget Map, the Create_View procedure 362 checks the rules in the access control tree 170 to determine if the given user is in fact an authorized user with access to at least some managed objects. If so, then Create_View analyzes every rule applicable to both the given user and the objects in the given table and updates the userTargetMap by either setting the appropriate flag of the userTargetMap or by updating the list of the FDNs in the item Deny list and/or item Grant list.

The Create_View procedure 362 then converts the userTargetMap for a user-table pair into a "Create View" SQL command 360. An exemplary SQL statement for creating a View is as follows:

```
CREATE VIEW view_Table1_scoft FROM Table1
  WHERE FDN IN
  {FDN for managed object 1,
  FDN for managed object 2,
  . . . }
```

All the rows of the table that are accessible using the View created by this command have their FDNs listed in the Where clause. To determine which rows of the table should be listed in the Where clause, the userTargetMap is interpreted as follows:

- If the global DenyFlag is set, then the Create_View procedure 362 creates an empty view.
- If the default access action is to grant access, or the global Grant Flag is TRUE, then the Create_View procedure 362 inspects the item Deny List and adds to the Where clause the FDN of every row (item) in the applicable table not included in the item Deny List.
- Otherwise, the Create_View procedure 362 determines the objects listed in the item Grant List, and adds to the Where clause the FDN of each row (item) included in the item Grant List.

In an alternate embodiment, the Where clause of the "Create View" SQL command can be shortened by mapping the scope and filter fields of target objects in the access control tree 170 into corresponding Where clause conditions. As a result, some items in the Where clause may use wildcard characters so as to represent an entire subtree of managed objects. Other items in the Where may place a condition on a subtree of objects, or even on the entire tree of objects, thereby indirectly specifying the objects to be included in the View. An example of a Create View command showing both of these ways of specifying groups of objects to be included in a View is as follows:

```
CREATE VIEW view_Table1_scott From Table1
WHERE         FDN LIKE "/partial_path1/%" OR
              FDN LIKE "/partial_path2/%" OR
              FDN = "/paramx=x3/" OR
              FDN = "/owner=abccompany/"
                    .
                    .
                    .
```

where "/partial_path1/%" and "/partial path2/%" both indicate that all objects in the managed object subtree whose path begins with the specified partial path are included in the defined View.

After creating a View, the Create_View procedure 362 grants the user for whom the View was created permission to use it. For example, the SQL command for granting permission to use a View may look like:

| | | |
|---|---|---|
| Format of Grant command: | | |
| GRANT privilege type | ON view_name | TO user |
| Example of Grant Command: | | |
| GRANT SELECT | ON view_Table1_scott | TO scott. |

After executing this GRANT statement, the system administrator, a user named "scott" can utilize the View named "view_Table1_scott."

In an alternative embodiment, a single View can be created to access management information stored in multiple tables. Alternatively, a single View can be created and access to the View can be granted to a group of users who are all members of a group having a group name, either using a group grant command or by executing one or more Grant commands listing multiple users.

Querying a View

Referring back to FIG. 10, once a View is created, when a user 300 issues an SQL command to access the DBMS 280, the database access engine 286 recognizes from the name that a View has been requested and a view access controller 380 checks that the user 300 has permission to query the View. The view access controller 380 responds to the database engine 286 to let the database engine 286 know whether to query the View named in the user's SQL command.

Updating a View

In this embodiment, the access control server 330 has an access control configuration procedure 210 (see FIG. 4) that performs all changes to the access control database. In this embodiment, the access control configuration procedure 210 issues a command, a Call to an Update_View procedure 372. The Update_View procedure 372 deletes the existing View by causing the DBMS to execute a Delete View SQL instruction 370. The Update_View procedure 372 then calls the Create_View procedure 362 to re-create the View.

Memory

Figure 12B:
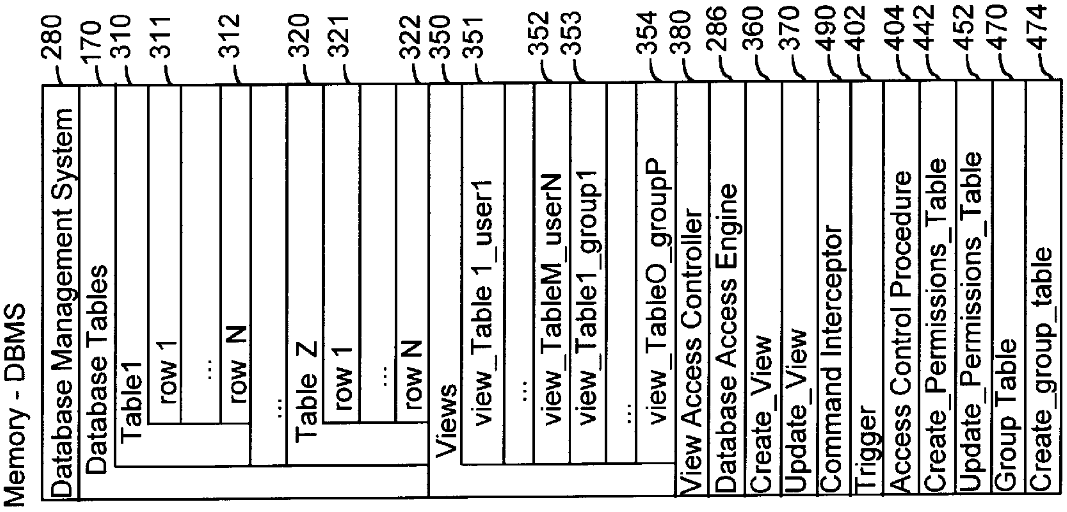
FIG. 12B depicts some existing and additional information that is stored in the memory of the DBMS for this second embodiment and the third embodiment.
Figure 12A:
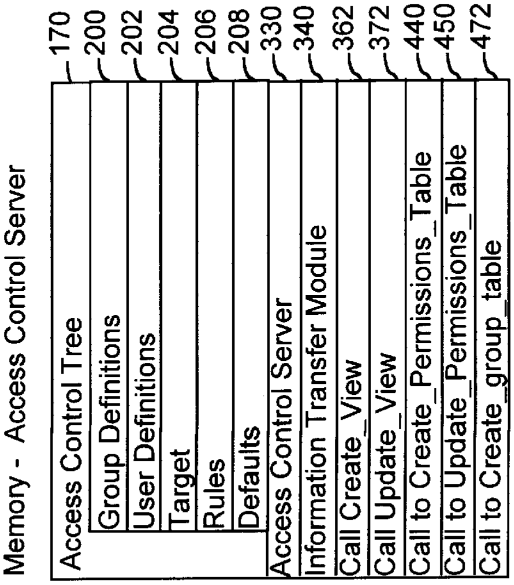
FIG. 12A depicts some existing and additional information that is stored in the memory of the access control server for this second embodiment and a third embodiment.

Referring to FIGS. 12A and 12B, the memory of the access control server and the DBMS store additional data and procedures. FIG. 12A depicts some of the previously described as well as some additional information that is stored in the memory of the access control server 330 for this second embodiment:

- the access control tree 170;
- the rules 206 of the access control tree 170, which include target objects 204, rule objects 206, group objects 200 and user objects 202;
- the Create_View procedure 362 to invoke the Create View SQL command 360 of the DBMS 280; and
- the Update_View procedure 372 as described above.

FIG. 12B depicts some of the information that is stored in the memory of the DBMS 280 for the second embodiment:

- database tables 1 through N 310, 320, each having rows 311, 312, 321, 322;
- the database access engine 286;
- the set of Views 350, including Views 351, 352 generated for individual users and/or Views 353, 354 generated for groups of users;

the Create View SQL command 360;
the Delete View SQL command 370;
grant access SQL command 374;
revoke access SQL command 376; and
the view access controller 380.

Methods for Controlling Direct Access to Managed Objects

Figure 13A:
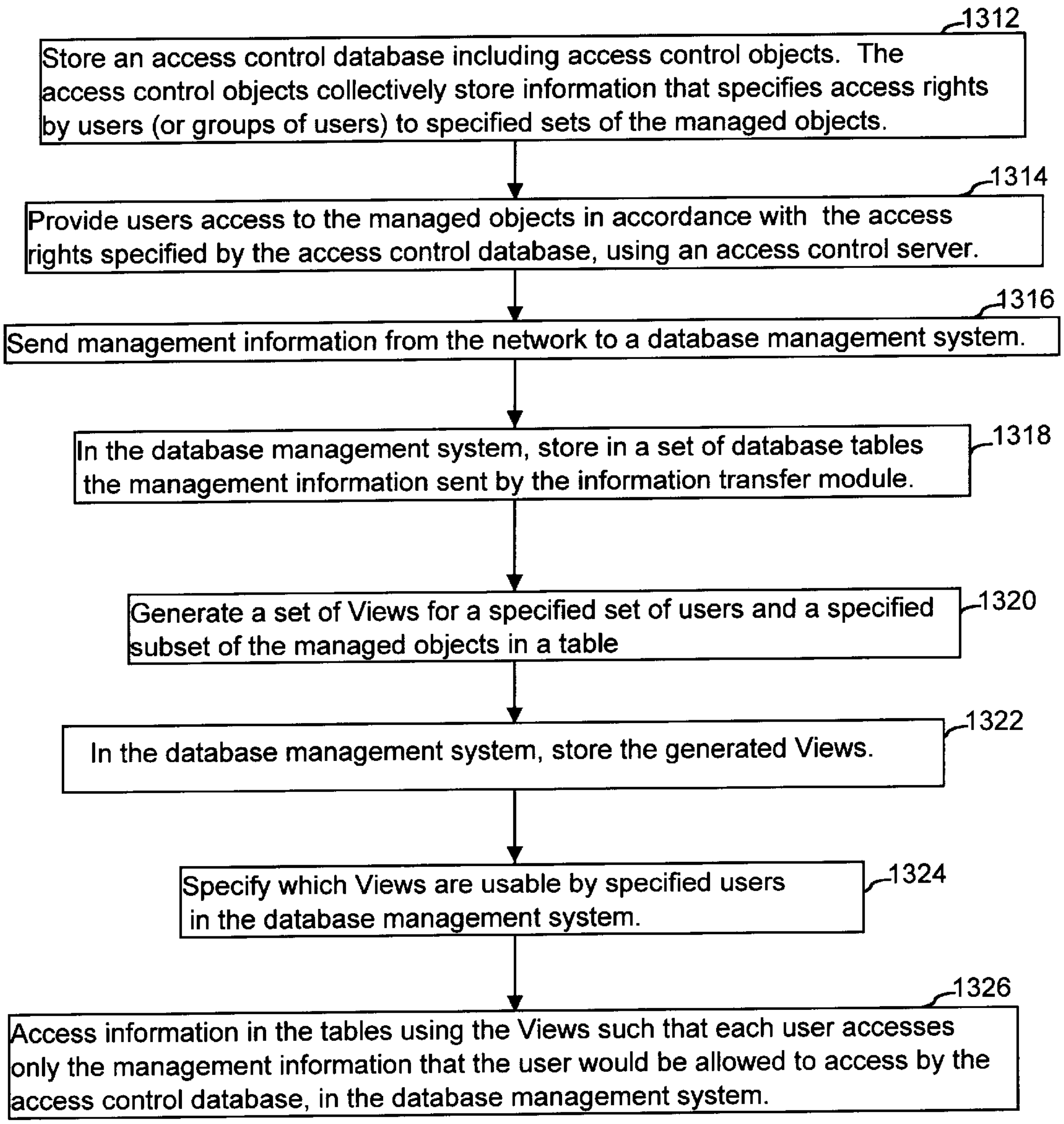
FIG. 13A depicts a method for controlling direct user access to managed objects for users.

FIG. 13A depicts a method for controlling direct user access to managed objects for users and groups respectively.

Direct Access by Users

Referring to FIG. 13A, steps 1312 and 1314 represent initial configuration of the access control server and its subsequent utilization. More specifically, in step 1312 an access control database including access control objects is stored. The access control objects collectively store information that specifies the access rights by users (as well as groups of users) to specified sets of the managed objects. The specified access rights include access rights to obtain management information from the network.

Step 1314 provides users access to the managed objects in accordance with the access rights specified by the access control database using the access control.

Steps 1316, 1318, 1320, 1322 and 1324 represent a procedure for setting up a DBMS to provide at least some users with direct access to management information, with access limitations consistent with those enforced by the access control server. In step 1316, management information is sent from the network to the database management system. In other words, for certain types of managed objects, management information is duplicated and stored in the DBMS. Typically, a separate DBMS table is set up for each distinct type of managed object that is to be accessible via the DBMS. In the second and third embodiments, logs and log entries are treated like all other objects.

Step 1318 stores the management information sent by the information transfer module in a set of database tables in the database management system. The tables store the management information in individual rows for corresponding managed objects. In other words, the DBMS stores the information for each managed object in a distinct row of a table set up for that managed object type.

In step 1320, a set of Views for a specified set of users and a specified subset of the managed objects in the table is generated.

In step 1322, a set of Views is stored in the database management system. The set of Views limit access to the management information stored in the tables. Each View in the set defines a subset of rows of a particular table that are accessible using this View. The set of accessible rows corresponds to the managed object access rights specified by the access control database for a particular user (or group of users).

Step 1324 specifies Views are usable by specified users (or groups of users) of the database management system.

In step 1326, information in the tables is accessed using the views such that each user accesses only the management information that the user would be allowed to access by the access control database in the database management system. Once the DBMS has been set up by the preceding steps, users can continue to utilize the Views and information in the DBMS indefinitely.

Steps 1316, 1318 for sending management information to the DBMS, preferably operate on a continuous or periodic basis so as to ensure that up-to-date information is stored in the DBMS. Steps 1320, 1322 also represent an ongoing process. Changes to the access control database are replicated in the DBMS by making corresponding changes to the View definitions.

Direct Access by Groups

When Views are generated for groups of users instead of individual users, each group of users corresponds to one of the group objects in the access control tree 170, and each View is usable by just one group of users. Each authorized user, when logging onto the DBMS, is identified as a member of one of the groups for which Views have been generated. If a user is a member of more than one group, the user is required to identify the group access rights that the user will be using when accessing data in the DBMS.

Method of Updating Views

Figure 13B:
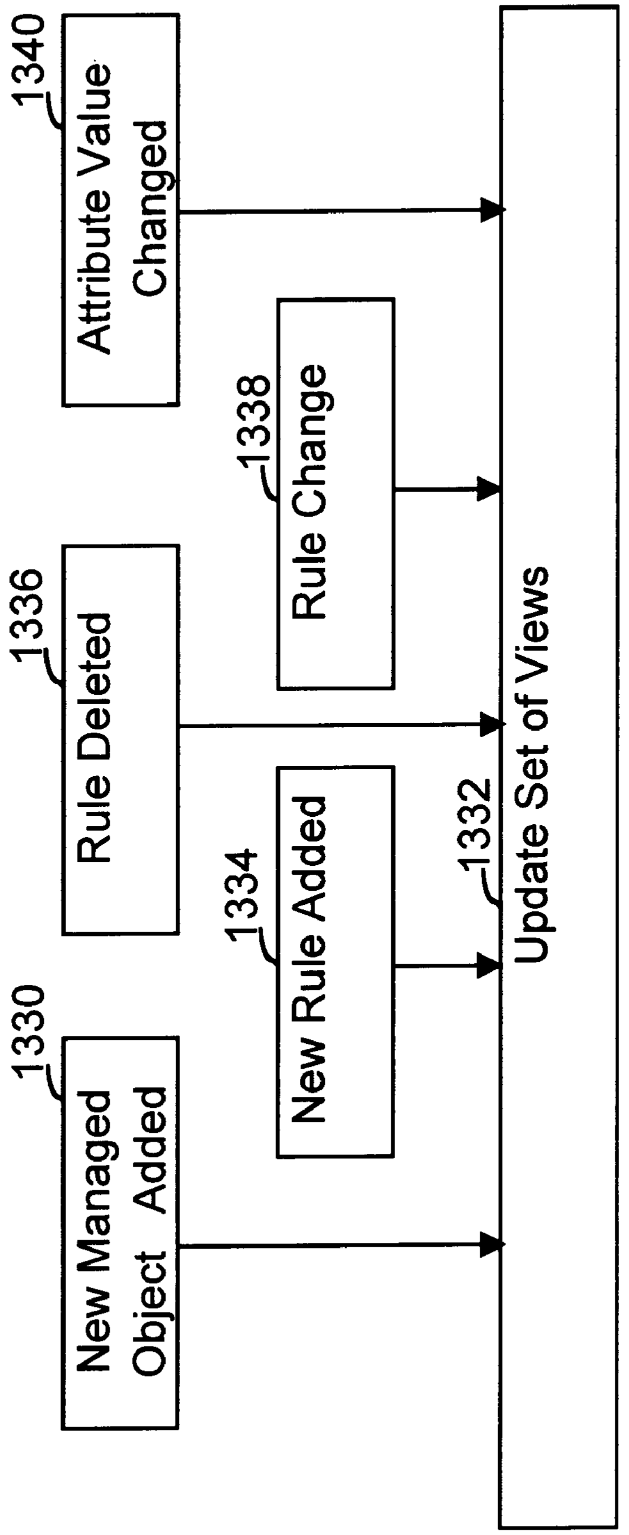
FIG. 13B is a flowchart showing when views are updated.

Referring to FIG. 13B, whenever a new managed object has been added to the managed object tree (step 1330), the Update_View procedure is called (1332) so as to update the set of Views defined in the DBMS. Similarly, whenever an access rule is added (step 1334), deleted (step 1336) or changed (step 1338) in the access control database, the Update_View procedure is called (1332) so as to update the set of Views defined in the DBMS.

When an attribute value of a managed object changes (step 1340), the Update_View procedure may be called (Step 1332). The filter field of the access control database is a way of defining access rights using attribute values of the managed objects. As stated above, the filter field is equivalent to the SQL "WHERE" clause. In particular, the Update_View procedure is called if the rules in the access control database have a filter and the access rights of a user with respect to a managed object changed.

In this embodiment, Views are not updated when a managed object is deleted. When a View is queried, the management information for deleted managed objects is not returned to the user. In an alternative embodiment, the Update_View procedure 372 is called when a managed object is deleted.

When calling the Update_View procedure, the parameters passed to the procedure include a list of user names and a list of database tables containing managed objects. The Views for every possible pairing of the listed user names and tables are regenerated based on the current object access rules for the listed tables. As explained next, the list of database tables for which Views are updated is preferably limited to those Views that are potentially affected by the managed object creation or the change in the access rules.

When an object is added to the managed object tree, or an access rule is added or modified concerning an object, the only Views that need to be modified are the Views for the table or tables used to store information about that object's object type. There is only one table in the database for each object type, and therefore only the Views for that one table need to be updated when a corresponding object is added or a rule for a corresponding object is created or modified.

With regard to event log tables, the Views for such tables are generally not affected by the addition of objects to the managed object tree, but in some circumstances a change to the access control rules may affect access to both the event log tables as well as one or more managed object tables. For instance, a rule change that globally denies a particular user access to all management information may cause changes to a number of Views, or alternately may cause all the Views for that user to be deleted from the DBMS. Similarly, a rule change giving a user a wider range of access rights to a large subtree of managed objects may cause updates to a number of Views.

An example of View updates caused by creation of a new managed object is as follows. Assume that database tables called XTable, YTable and ZTable represent the classes of managed objects called X-MOC, Y-MOC and Z-MOC respectively. Also assume that XTable has three rows representing X1-MOI, X2-MOI and X3-MOI, that there are two users U1 and U2, and that there are two Views for XTable: view__XTable__U1 and view__XTable__U2. If a new managed object instance called X4-MOI is created, the Update__ View procedure 372 checks the access control database to determine if X4-MOI should be added to to either of the two views. If, after checking the access control database, Update__View determines that X4__MOI belongs only to the X-MOC class, the views affecting XTable will need to be updated. Since the other tables, YTable and ZTable, are not affected then their views are not affected. In summary, creation of the X4-MOI object requires only the view__ XTable__U1 and view__XTable__U2 Views to be updated. However, the only Views that will be actually be modified are those for users who have read access to the newly added object.

Operation of the Update View Procedure

The parameter list for the Update__View procedure 372 includes a list of user names and a list of database tables. The Views for every possible pairing of the listed user names and tables are regenerated based on the current object access rules for the listed tables. In other words, the existing Views for these user-table pairs are deleted and updated ones are generated. See the above explanation of the Create__View procedure 362 for generating database Views.

Alternately, in certain situations previously generated Views can be modified instead of being regenerated. For instance, when new managed objects are created, the definitions of previously created Views can be modified by adding the FDNs for the newly created objects to the applicable ones of the previously created Views.

The Third Embodiment of a Direct Information Access System

Figure 14:
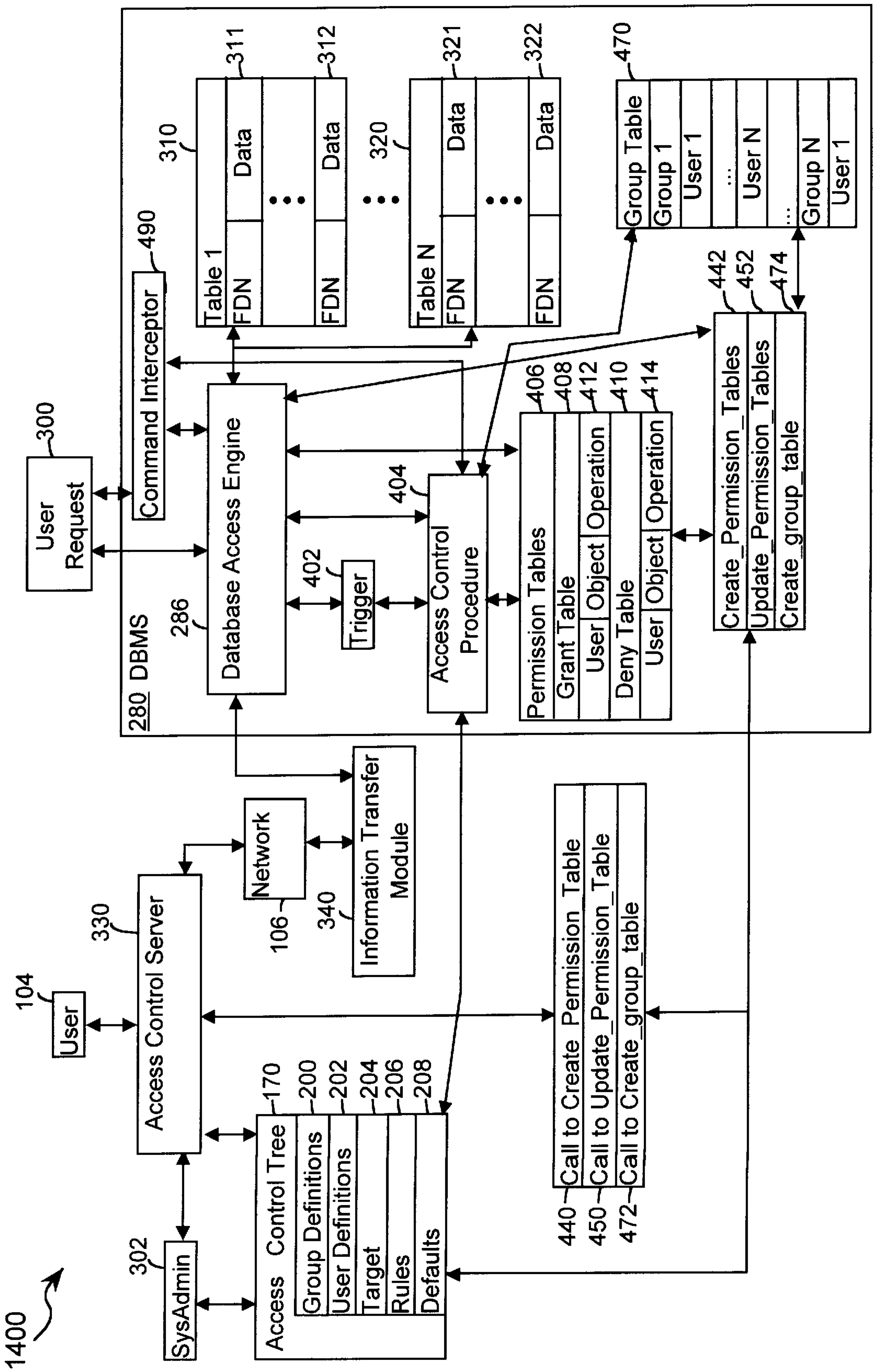
FIG. 14 is a block diagram of the third embodiment of a direct information access system that uses triggers to redirect processing of select queries to an access control procedure.

Referring to FIG. 14, a direct information access system 1400 that uses triggers is shown. The primary components of the direct information access system 1400 are: a conventional DBMS 280 for storing tables 310, 320, an access control server 330, an access control tree 170, an information transfer module 340, and a network 106. Except as noted below, the components of the system 1000 described above with reference to FIG. 10 are also suitable for use with this third embodiment.

The database tables 310, 320 and rows 311, 312, 321, 322 described for the second embodiment of the direct information access system are suitable for use with the third embodiment. Like the second embodiment, in the third embodiment, the rows 311, 312, 321, 322 of the tables 310, 320 contain management information for managed objects. The same management information access rights and restrictions that are represented by the access control tree 170 are also enforced by the DBMS of this third embodiment.

The third embodiment uses a database trigger 402 to initiate the execution of an access control procedure 404 whenever certain SQL commands are received. The access control procedure 404 uses permissions tables 406 to determine whether to grant or deny access to management information stored in the DBMS. The trigger mechanism is a feature of the database access engine 286 of the DBMS 280 and in particular, this DBMS 280 is configured to invoke a trigger 402 whenever an SQL select command is received by the DBMS.

The Permissions Tables

In this third embodiment, access control for a particular user on a particular managed object is defined by a permissions table or tables 406. Preferably, the present invention has an access Grant table 408 and an access Deny table 410. Each table stores permission entries 412, 414.

Creating the Permission Tables

The system administrator 302 creates the permissions tables prior to use of the DBMS 280 by end users. A call 440 to a create permissions procedure 442 is used to create the permissions tables. The "Create_Permissions__Tables" procedure 442 is stored in the DBMS 280. The system administrator 302 invokes a call 440 to the "Create__Permissions__ Tables" 442 procedure of the DBMS 280. The Create__ Permissions__Tables 442 procedure maps the user access rights as defined by the access control tree 170 into the proper format for the permissions tables.

Referring also to FIGS. 15A and 15B, a permission entry 1502, 1504 is tuple having three fields, as shown below:

(user name, object name, operation type).

Although FIGS. 15A and 15B show the object name in each permission entry as a single "word," preferably the object name is the FDN for a managed object.

The user name is the name of the user (or the group of users) whose access rights are represented by the permission entry, the object name identifies the managed object to which the permission entry applies, and the operation type is the operation that the specified user is being granted or denied with respect to the specified object. The operation type can be a select, delete, insert or update operation.

The two permissions tables reflect the manner in which the X.741 access rules are specified: Global grant, Global grant with item deny, Global deny with item grant, and Global deny.

The Grant table 408 stores a list of all access Grant permissions. The Deny table 410 stores a list of all access Deny permissions. When checking whether access should be permitted for a particular operation, the access control procedure 404 checks both tables.

Populating the Permissions Tables

The permissions tables 406 are populated to correspond to the access control rules 206 of the access control tree 170. By convention, the permissions tables 406 use a special object name value, such as a database NULL value, to represent "all objects," and a special operation type value, such as a database NULL value, to represent "all operation types."

The permissions tables 406 are populated as follows:

If the rule in the access control database specifies "global grant" to user U1 for operation type Op1, an entry is made in the grant table 408 which is (U1, NULL, Op1).

If the rule in the access control database specifies "global grant to user U1 with item deny for items X1, X2 and X3" for operation type Op1, the following entries are made in the grant table 408 and the deny table 410:

| | |
|---|---|
| GRANT TABLE: | (U1, NULL, Op1) |
| DENY TABLE: | (U1, X1, Op1) |
| | (U1, X2, Op1) |
| | (U1, X3, Op1) |

If the rule in the access control database specifies "deny user U1 access to all items except items X1, X2 and X3" for operation type Op1, then the following entries are made in the deny table 410 and grant table 408:

| | |
|---|---|
| DENY TABLE: | (U1, NULL, Op1) |
| GRANT TABLE: | (U1, X1, Op1) |
| | (U1, X2, Op1) |
| | (U1, X3, Op1) |

If the rule says "global deny" to user U1 for the operation type Op1, the following entry is made in the deny table 410:

DENY TABLE: (U1, NULL, Op1)

In all the above, multiple entries can be made for different operation types. If the user's permissions on the managed object are the same for all operation types, then a single entry with the NULL operations type will suffice.

The method described above is a more efficient way to store access control rules than storing only explicit grant rules or storing only explicit deny rules. For example, if one were to store only grant rules, then in a system with 5,000 managed objects, a new user given a global grant with a single item deny would require 4,999 records in the Grant Table 408. Using the method described above, the new user would have just two entries: one entry in the Grant Table and another entry in the Deny table 410.

Rules in the access control tree 170 that are defined in terms of a scope and filter are evaluated before entries are made in the grant table 408 and deny table 410. For example, if a scope and filter on the managed object tables results in a set of ten managed objects to which access must be granted with the rest being globally denied, then ten entries are made in the grant table 408 and a single global deny entry is made in the deny table 410.

Enforcing Access Control

Enforcement of Access Control Rules based on permission tables is done according to the following algorithm, which assumes that an operation is requested by user U1.

These steps are followed in sequence unless a grant or deny decision is reached in any one step, in which case the algorithm exits.

1. Check the Deny table to see if the User U1 has a global deny (i.e., a deny to all objects). If so, check the Grant table to see if the user has specific granted items (objects) that are exceptions to the deny. If any such objects exist, grant access if the current operation matches the operation specified in the Grant table, otherwise deny access.
2. Check the Grant table to see if the User U1 has a global grant (i.e. a grant to all objects). If so, check the Deny table to see if the user has specific denied items (objects) that are exceptions to the grant. If any such objects exist, deny access if the current operation matches the operation specified in the Deny table, otherwise grant access.
3. Check the Deny table to see if User U1 has specific denied items (objects), and deny access if the current operation matches the operation specified in the Deny table.
4. Check the Grant table to see if User U1 has specific granted items, and grant access if the current operation matches the operation specified in the Grant table.
5. Check the Deny table to see if there is an all-users global deny (i.e., deny all objects to all users). If so, check the Grant table to see if all users have specific granted items (objects) that are exceptions to the deny. If any such objects exist, grant access if the current operation matches the operation specified in the Grant table, otherwise deny access.
6. Check the Grant table to see if there is an all-users global grant (i.e., grant all objects to all users). If so, check the Deny table to see if all users have specific denied items (objects) that are exceptions to the grant. If any such objects exist, deny access if the current operation matches the operation specified in the Deny table, otherwise grant access.
7. Check the Deny table to see if all users have specific denied items (objects). If so, deny access if the current operation matches the operation specified in the Deny table.
8. Check the Grant table to see if all users have specific granted items (objects). Grant access if the current operation matches the operation specified in the Grant table.
9. If no grant/deny decision has been reached following the steps above, apply the default Access Control Rule (default deny or default grant).

When the user submits a query requesting access to multiple objects, such as a request for the status of all routers in the network or a request for information about a specified list of managed objects, the access control procedure 404 performs the applicable access rights checking method for all the requested objects. Access is allowed only for the objects to which the user has appropriate access rights. No information is returned to the user for other objects in the database, and thus the user is not informed that access has been denied to any objects. This is important, because the user must not be informed of even the existence of objects that are not within his purview. Also, the user should be able to simply request information about "all objects" of a particular type, without having to be concerned about excluding objects from the query to which the user does not have access.

If access to all the objects specified in a query is denied, the query is denied without providing a detailed explanation to the user. If access is granted for some object but not others, the access control procedure 404 enables the user query to be executed on the objects for which access is granted. In particular, in the preferred embodiment the access control procedure 404 executes the user query against those objects and returns the results to the user. As a result, the normal query processing by the database access engine is circumvented and replaced by processing performed by (or initiated by) the access control procedure 404. The data read from the DBMS tables by the access control procedure 404 is returned to the requesting user or process in the same way that the data would have been returned if the query had been processed by the database access engine.

Exemplary Permission Tables

FIGS. 15A and 15B depict an exemplary Grant table and Deny table respectively.

In an alternative embodiment, the permissions tables can use group names 510 in addition to user names to manage access by groups of users.

Figure 16A:
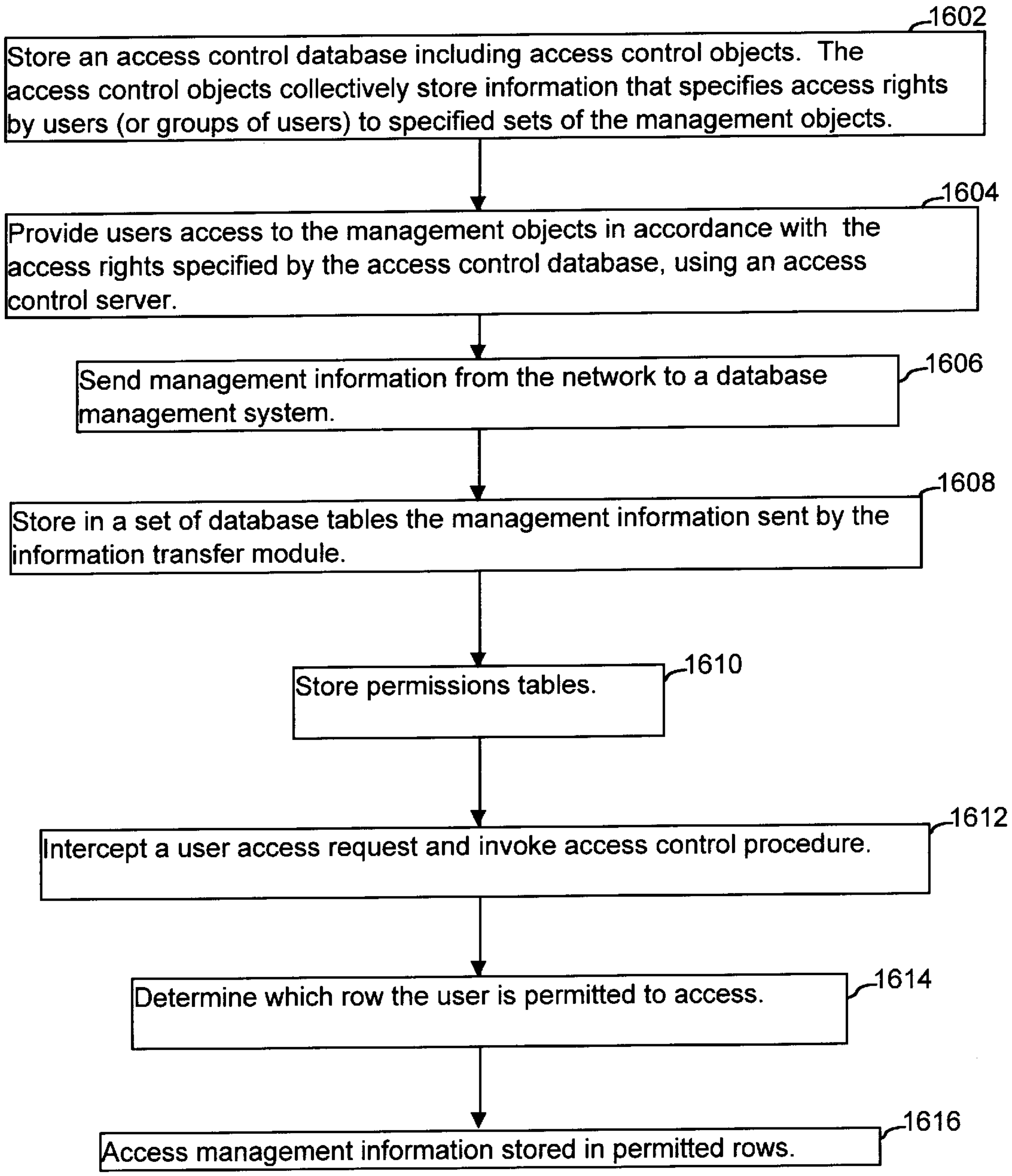
FIG. 16A depicts a method of controlling user access to management information stored in a DBMS.

Method of Controlling Direct Access Using Permission Tables Direct Access by Users Referring to FIG. 16A, steps 1602 and 1604 represent initial configuration of the access control server and its subsequent utilization, and are essentially identical to step 1312 and 1314 in FIG. 13A.

Steps 1606, 1608, 1610 and 1612 represent a procedure for setting up a DBMS to provide at least some users with direct access to management information, with access limitations consistent with those enforced by the access control server. In step 1606, management information is sent from the network to the database management system. In other words, for certain types of managed objects, management information is duplicated and stored in the DBMS. Typically, a separate DBMS table is set up for (A) each distinct type of managed object that is to be accessible via the DBMS, and (B) for each distinct log file defined in the log server (as described above).

Step 1608 stores the management information sent by the information transfer module in a set of database tables in the database management system. The tables store the management information in individual rows for corresponding managed objects. In other words, excluding log tables, the DBMS stores the information for each managed object in a distinct row of a table set up for that managed object type.

In step 1610, at least one permissions table, including permission objects is stored. The permission objects collectively store information that specifies the access rights by users to specified sets of the managed objects, the specified access rights include access rights to obtain management information from the network. The access rights specified by the permission objects correspond to the managed object access rights specified by the access control database for at least one of the users.

Step 1612 represents the action of the DBMS trigger, which intercepts a user access request to access management information stored in managed objects stored in a desired table in the database, and then invokes the access control procedure 404.

Step 1614 represents the action of the access control procedure 404, which limits access to the management information stored in the set of database tables. The access control procedure uses the set of access rights stored in the permissions table to determine which, if any, of the rows of data specified by the intercepted query are accessible by the user.

In Step 1618 the access control procedure accesses the management information stored in the subset of the requested rows for which access is permitted by the user.

Direct Access by Groups

When the permissions tables are configured to establish rights for groups of users, the DBMS will preferably include a group table 470 that enables user names to be mapped to group names. The user's access rights are then determined in accordance with access rights of the group of which the user is a member.

Operation of the Access Control Procedure

The access control procedure 404 can interact with the database access engine 286 in two ways. The first of these two ways is represented by FIG. 16B and the second by FIG. 16C.

Figure 16B:
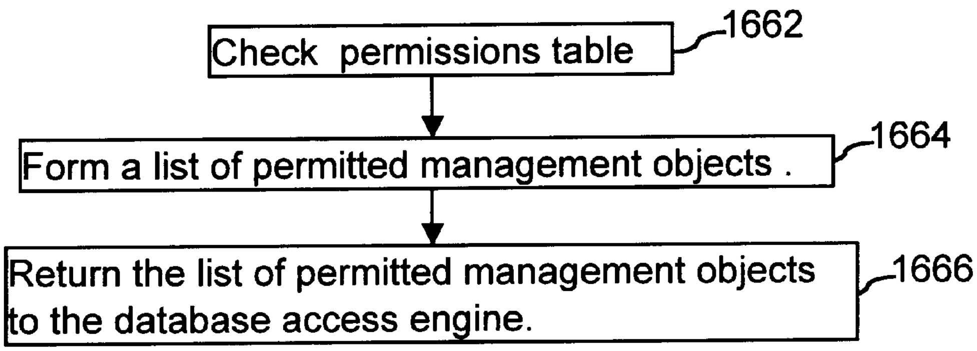
FIG. 16B depicts a first method of operation for the access control procedure after a trigger has been detected.

Referring to FIG. 16B, after a trigger has been detected and the access control procedure has been invoked, the access control procedure 404 checks the permissions tables (step 1662) using one of the methods described above, and forms a list of permitted managed objects (step 1664). If no managed objects are permitted, a null list is formed. Step 1666 returns the list of permitted managed objects to the database access engine 286 to complete execution of the SQL command.

The access control procedure 404 also provides a return code to the database access engine 286 to indicate whether or not execution of the SQL command should be continued or aborted. If the value of the return code indicates that execution of the SQL command should be continued, the database access engine accesses the table rows specified by the returned list and returns the resulting information to the user. If the value of the return code indicates that execution of the SQL command should be aborted, the database access engine 286 returns a null result to the user.

Figure 16C:
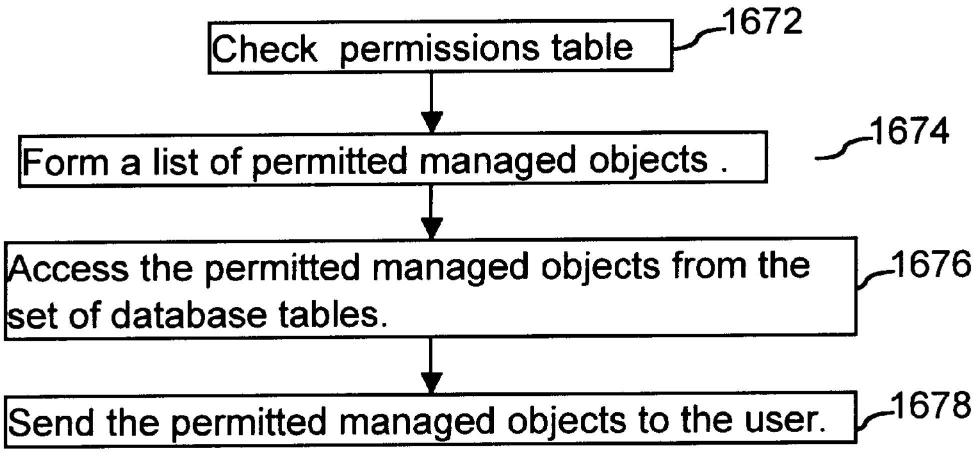
FIG. 16C is a second method of operation for the access control procedure after a trigger has been detected.

Referring to FIG. 16C, the first two steps (1672 and 1674) of the second method are the same as first two steps (1662 and 1664) of the first method. In the second method, however, the access control procedure 404 directly accesses the table rows, if any, specified by the previously formed list of permitted managed objects (step 1676), and then returns the resulting information to the user (step 1678), without returning control to the database access engine until processing of the received SQL command is completed.

Updating the Permissions Tables

Figure 16D:
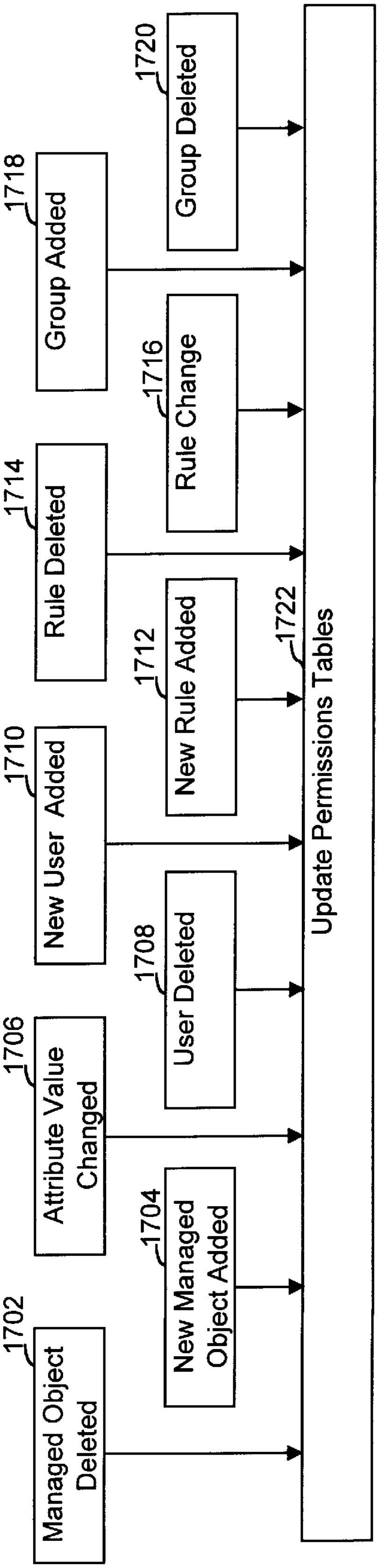
FIG. 16D is a flowchart showing when the permissions tables are updated.

FIG. 16D is a flowchart showing when the permissions tables are updated. Managed objects can be created, deleted, or have their attribute values changed. These changes may affect the access control permissions on the managed objects, depending on the definition of the access control rules.

In this third embodiment, the access control configuration procedure 210 issues a call 450 to an update__permission__tables 452 procedure that causes the DBMS to execute the update__permission__tables 452 procedure. The permissions tables are updated depending on what changes occur to the managed objects.

The permissions tables are updated by calling the update__permission__tables 452 procedure when: a managed object is deleted (1702), a new managed object is added (1704), an attribute value is changed (1706), a user is deleted (1708), a new user is added (1710), a new rule is added (1712), a rule is deleted (1714), a rule is changed (1716), a group is added (1718), and a group is deleted (1720).

If a managed object is deleted, in step 1722, the update__permission__tables 452 procedure deletes all records having that managed object name from the permissions tables 406.

If a managed object is created, in step 1722, the update__permission__tables 452 procedure checks all access control rules to determine which users may access the managed object, and the appropriate entries are made in the permission tables.

If a managed object has its attribute value changed, in step 1722, the update__permission__tables 452 procedure checks all access control rules to determine which users can access the managed object. If any access control rules depend on the value of changed attribute, the appropriate entries are made (and/or revised) in the permission tables 406.

If a user is deleted (i.e., removed from the set of users recognized by the access control engine), in step 1722, the update__permission__tables 452 procedure deletes all records that have that user name from the permissions tables 406.

If a new user is added and if specific access control rules are not defined for the new user, then, in step 1722, the update__permission__tables 452 procedure applies the default access control rules to the new user and updates the permissions table. If specific access control rules are defined for the new user, then the update_permission_tables 452 procedure applies the specific access control rules. The permissions table is updated accordingly.

If a group is deleted, then in step 1722, the update_permission_tables 452 procedure deletes all records that have that group name from the permissions tables 406.

If a new group is added, then in step 1722 the update_permission_tables 452 procedure determines if specific access control rules are defined for the new group. If not, the update_permission_tables 452 procedure applies the default access control rules to the new group and updates the permissions table. If so, the update_permission_tables 452 procedure applies the specific access control rules. The permissions table is updated accordingly.

Memory

Referring back to FIGS. 12A and 12B, the memories of the access control server and the DBMS store additional data and procedures to support the third embodiment of the direct access facility. As shown in FIG. 12A some additional procedures stored in the memory of the access control server 330 for this third embodiment include:

- a call to Create_Permissions_Table 440;
- a call to Update_Permissions_Table 450; and
- a call to Create_Group_Table 472.

As shown in FIG. 12B, some additional data and procedures that are stored in the memory of the DBMS 280 for this third embodiment include:

- a command interceptor 490 (described below);
- a group table 470;
- the trigger 402;
- the access control procedure 404;
- permission tables 406 including the grant table 408 and the deny table 410;
- the Create_Permission_Tables 442 procedure;
- the Update_Permission_Tables 452 procedure; and
- a Create_group_table 474 procedure (described below).

Extensions

The third embodiment can also apply to groups of users in users belong to groups and access control is defined for the group of users. In the permissions tables, the "user name" is replaced by the "group name" and the permissions tables contain entries for groups of users. The permissions may be defined only for groups, or be defined for a combination of groups and individual users.

The group table 470 maps user names to group names, the access control procedure 404 checks the group table to determine which groups a user belonged to, and then checks the permissions for all such groups in the permissions table following the methods described above. The memory of the access control server includes a call 472 (see FIG. 12A) to the create_group_table 474 procedure in the DBMS. The system administrator 302 creates the group tables in a manner similar to the permissions tables described above.

In another alternative embodiment, the access control procedure 404 grants or denies access to that user based on the application's particular policy. For example, if the policy is "most restrictive," then access to a particular object is denied to the user if any one the user's groups is denied access to that object. If the policy is "least restrictive," then access to an object is granted to the user if any one of the user's groups has been granted access to the object.

In an alternative embodiment, an equivalent mechanism to the trigger can be supplied by inserting an access control application layer such as the SUN Solstice Enterprise manager's em_sql to intercept all user queries and invoke stored procedures to control access. In FIG. 14, a command interceptor 490 intercepts the user request 300 and determines whether to execute the access control procedure 404.

Alternately, the command interceptor 490 invokes the access control procedure 404 when an SOL SELECT command is detected.

In the second and third embodiments views and permissions tables may be created either for all users, or for a designated subset of users.

The second and third embodiments of the present invention are also suitable for use with systems having a "guaranteed commit" feature. Such systems may have a shadow database with shadow objects for some or all existing managed objects. In the shadow database, if a managed object is unavailable, the shadow object will accept changes to the managed object. The shadow object polls the managed object and pushes the change to the managed object when the managed object becomes available. The shadow database can send event and message information to be stored in the database tables 310, 320 of DBMS 280 of the present invention.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer program product for controlling access to managed objects in a distributed network, the computer program product for use in conjunction with a computer system, the computer program product comprising a computer readable storage medium and a computer program mechanism embedded therein, the computer program mechanism comprising:

- instructions that store an access control database, including access control objects, the access control objects collectively storing information that specifies access rights by users to specified sets of the managed objects, the specified access rights including access rights to obtain management information from the network;
- instructions for retrieving management information from the managed objects, in response to user access requests, the retrieving instructions including instructions for granting and denying access requests in accordance with the access rights information stored in the access control database;
- instructions that send management information from the network to a database management system; the management information sent to the database system replicating information stored in the managed objects in the network;
- instructions that, in the database management system:
  - store in a set of database tables the management information sent by the send instructions, wherein each table in the set of database tables stores in individual rows the management information for corresponding managed objects;
  - store in at least one permissions table, including permission objects, the permission objects collectively storing information that specifies the access rights by users to specified sets of the managed objects, the specified access rights including access rights to obtain management information from the network, wherein the access rights of the permission objects correspond to the managed object access rights specified by the access control database for at least one of the users;

intercept a user access request to access management information stored in the database tables;

invoke an access control procedure when the user access request is a select statement to access any of the set of database tables;

limit access, in the access control procedure, to the management information stored in the set of database tables, the access control procedure using the set of access rights stored in the at least one permissions table to define a permitted subset of rows in at least one of the database tables that are accessible, wherein the permitted subset of rows corresponds to the managed object access rights specified by the at least one permissions table for at least one of the users; and access management information stored in the permitted rows in the set of database tables.

2. The method of claim 1 wherein the access control procedure accesses the permitted rows stored in the set of database tables.

3. The method of claim 1 wherein the access control procedure returns a list of permitted rows, and the select statement uses the returned list to access the permitted rows.

4. The method of claim 1 wherein a trigger is used to invoke the access control procedure.

5. The method of claim 1 wherein the select statement causes a trigger to invoke the access control procedure and the access control procedure modifies at least one parameter of the select statement so as to access only the permitted subset of rows.

6. The method of claim 5, further including the updating the at least one permissions table for a specified set of users and a specified subset of the managed objects.

7. The method of claim 6, wherein the updating is invoked when a new managed object is added to the network.

8. The method of claim 6, wherein the updating is invoked when the specified access rights are changed.

9. A computer program product for controlling access to managed objects in a distributed network, the computer program product for use in conjunction with a computer system, the computer program product comprising a computer readable storage medium and a computer program mechanism embedded therein, the computer program mechanism comprising:

an access control procedure that limits access to management information stored in a set of database tables, the access control procedure using a set of access rights stored in at least one permissions table to define a permitted subset of rows in at least one of the database tables that are accessible, wherein the permitted subset of rows corresponds to the managed object access rights specified by the at least one permissions table for at least one user; wherein the at least one permissions table include a plurality of grant entries and a plurality of deny entries, each grant entry specifying one or more rows in at least one of the database tables that are accessible by a specified user or group of users, and each deny entry specifying one or more rows in at least one of the database tables that are not accessible by a specified user or group of users;

instructions that intercept a user access request to access management information stored in the set of database tables; and instructions that invoke the access control procedure when the user access request is a select statement to access any of the set of database tables to define the permitted subset of rows in the database tables; the access control procedure applying the grant entries and deny entries, if any, applicable to the user access request in accordance with a predefined set of rules so as to define the permitted subset of rows.

10. The computer program product of claim 9 wherein the computer program mechanism further comprises:

one or more instructions that create the at least one permissions table including permission objects, the permission objects for collectively storing information that specifies the access rights by users to specified sets of the managed objects, the specified access rights including access rights to obtain management information from the network.

11. The computer program product of claim 10 wherein the computer program mechanism further comprises:

instructions that store an access control database, including access control objects, the access control objects collectively storing information that specifies access rights by users to specified sets of the managed objects, the specified access rights including access rights to obtain management information from the network, wherein the access rights of the permission objects correspond to the managed object access rights specified by the access control database for at least one of the users.

12. The computer program product of claim 9 wherein the computer program mechanism further comprises:

a database management system comprising the set of database tables wherein each table in the set of database tables stores management information for corresponding managed objects in rows.

13. The computer program product of claim 9 wherein the computer program mechanism further comprises:

instructions that access the management information stored in the permitted subset of rows in the set of database tables.

14. The computer program product of claim 9 wherein the computer program mechanism further comprises:

instructions that receive management information from the network; and instructions that store in the set of database tables the received management information, wherein each table in the set of database tables stores in rows the management information for corresponding managed objects.

15. The computer program product of claim 9 wherein the computer program mechanism further comprises:

instructions that store the information that specifies the access rights by users to specified sets of the managed objects in the at least one permissions table.

16. The computer program product of claim 9 wherein the access control procedure further comprises:

instructions that return a list of permitted rows, and the select statement uses the returned list to access the permitted rows.

17. The computer program product of claim 9 wherein the instructions that invoke the access control procedure include a trigger.

18. The computer program product of claim 9 wherein the select statement causes a trigger to invoke the access control procedure and the access control procedure includes instructions that modify at least one parameter of the select statement so as to access only the permitted subset of rows.

19. A method of controlling access to managed objects in a distributed network, comprising:

intercepting a user access request to access management information for managed objects stored in a set of database tables; and invoking an access control procedure to limit access to the management information stored in the set of database tables when the user access request is a select statement to access any of the set of database tables to define the permitted subset of rows in the database tables, the access control procedure using a set of access rights stored in at least one permissions table to define a permitted subset of rows in at least one of the database tables that are accessible, wherein the permitted subset of rows corresponds to managed object access rights specified by the at least one permissions table for at least one user; wherein the at least one permissions table includes a plurality of grant entries and a plurality of deny entries, each grant entry specifying one or more rows in at least one of the database tables that are accessible by a specified user or group of users, and each deny entry specifying one or more rows in at least one of the database tables that are not accessible by a specified user or group of user; the access control procedure applying the grant entries and deny entries, if any, applicable to the user access request in accordance with a predefined set of rules so as to define the permitted subset of rows.

20. The method of claim 19 further comprising:

creating the at least one permissions table including permission objects, the permission objects for collectively storing information that specifies the access rights by users to specified sets of the managed objects, the specified access rights including access rights to obtain management information from the network.

21. The method of claim 20 further comprising:

storing an access control database, including access control objects, the access control objects collectively storing information that specifies access rights by users to specified sets of the managed objects, the specified access rights including access rights to obtain management information from the network, wherein the access rights of the permission objects correspond to the managed object access rights specified by the access control database for at least one of the users.

22. The method of claim 19 wherein a database management system includes the set of database tables wherein each table in the set of database tables stores management information for corresponding managed objects in rows.

23. The method of claim 19 further comprising:

accessing the management information stored in the permitted subset of rows in the set of database tables.

24. The method of claim 19 further comprising:

receiving management information from the network; and storing in the set of database tables the received management information, wherein each table in the set of database tables stores in rows the management information for corresponding managed objects.

25. The method of claim 19 further comprising:

storing the information that specifies the access rights by users to specified sets of the managed objects in the at least one permissions table.

26. The method of claim 19 further comprising:

returning a list of permitted rows, wherein the select statement uses the returned list to access the permitted rows.

27. The method of claim 19 wherein said invoking includes a trigger.

28. The method of claim 19 wherein the select statement causes a trigger to invoke an access control procedure that modifies at least one parameter of the select statement so as to access only the permitted subset of rows.

29. An access control system for controlling access to managed objects in a distributed network, comprising:

an interceptor that intercepts a user access request to access management information for managed objects in a set of database tables; and an access control procedure that limits access to the management in formation stored in the set of database tables when the user access request is a select statement to access the management information for any of the managed objects, the access control procedure using a set of access rights stored in at least one permissions table that define a permitted subset of rows in at least one of the database tables that are accessible, wherein the permitted subset of rows corresponds to the managed object access rights specified by the at least one permissions table for at least one of the users; wherein the at least one permissions table includes a plurality of grant entries and a plurality of deny entries, each grant entry specifying one or more rows in at least one of the database tables that are accessible by a specified user or group of users, and each deny entry specifying one or more rows in at least one of the database tables that are not accessible by a specified user or group of users; the access control procedure applying the grant entries and deny entries, if any, applicable to the user access request in accordance with a predefined set of rules so as to define the permitted subset of rows.

30. The computer system of claim 29 wherein the at least one permissions table includes permission objects, the permission objects for collectively storing information that specifies the access rights by users to specified sets of the managed objects, the specified access rights including access rights to obtain management information from the network.

31. The computer system of claim 30 further comprising:

an access control database, including access control objects, the access control objects collectively storing information that specifies access rights by users to specified sets of the managed objects, the specified access rights including access rights to obtain management information from the network, wherein the access rights of the permission objects correspond to the managed object access rights specified by the access control database for at least one of the users.

32. The computer system of claim 29 further comprising:

a database management system comprising the set of database tables wherein each table in the set of database tables stores management information for corresponding managed objects in rows.

33. The computer system of claim 29 further comprising:

a database access engine that accesses the management information stored in the permitted rows in the set of database tables.

34. The computer system of claim 33 wherein the database access engine returns a list of permitted rows, and the select statement uses the returned list to access the permitted rows.

35. The computer system of claim 29 further comprising:

an information transfer mechanism that receives the management information from the network, and stores the received management information in the set of database tables, wherein each table in the set of database tables stores the management information for corresponding managed objects in rows.

36. The computer system of claim 29 wherein the information that specifies the access rights by users to specified sets of the managed objects is stored in the at least one permissions table.

37. The computer system of claim 29 wherein the access control procedure is invoked using a trigger when the user access request is a select statement to access the management information for any of the managed objects.

38. The computer system of claim 29 wherein the select statement causes a trigger to invoke the access control procedure when the user access request is a select statement to access the management information for any of the managed objects, and the access control procedure includes instructions that modify at least one parameter of the select statement so as to access only the permitted subset of rows.

* * * * *

UNITED STATES PATENT AND TRADEMARK OFFICE
CERTIFICATE OF CORRECTION

PATENT NO. : 6,236,996 B1
DATED : May 22, 2001
INVENTOR(S) : Bapat et al.

It is certified that error appears in the above-identified patent and that said Letters Patent is hereby corrected as shown below:

Column 36,
Line 25, delete "in formation" and insert -- information --.

Signed and Sealed this

Eleventh Day of June, 2002

*Attest:*

JAMES E. ROGAN

*Attesting Officer*

*Director of the United States Patent and Trademark Office*